United States Patent
Mistyurik

(10) Patent No.: US 9,452,625 B2
(45) Date of Patent: Sep. 27, 2016

(54) PRINTER WITH TOUCH PANEL AND LABEL EXIT ON DOOR

(71) Applicant: Avery Dennison Corporation, Pasadena, CA (US)

(72) Inventor: John Mistyurik, Troy, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/826,562

(22) Filed: Mar. 14, 2013

(65) Prior Publication Data

US 2014/0205356 A1 Jul. 24, 2014

Related U.S. Application Data

(60) Provisional application No. 61/756,175, filed on Jan. 24, 2013.

(51) Int. Cl.
| | |
|---|---|
| *B41J 15/04* | (2006.01) |
| *B41J 29/13* | (2006.01) |
| *G01G 19/415* | (2006.01) |
| *B41J 3/407* | (2006.01) |
| *B41J 3/46* | (2006.01) |
| *B41J 11/00* | (2006.01) |
| *B65H 19/12* | (2006.01) |

(52) U.S. Cl.
CPC .............. *B41J 15/042* (2013.01); *B41J 3/4075* (2013.01); *B41J 3/46* (2013.01); *B41J 11/0025* (2013.01); *B41J 15/04* (2013.01); *B41J 29/13* (2013.01); *B65H 19/126* (2013.01); *G01G 19/415* (2013.01); *B65H 2801/12* (2013.01); *B65H 2801/75* (2013.01)

(58) Field of Classification Search
CPC .... B41J 15/042; B41J 29/13; B41J 11/0025; B41J 11/0055; B41J 11/005; G01G 19/415
USPC ............. 242/578.2; 400/613, 693, 691, 703; 347/222
See application file for complete search history.

(56) References Cited

U.S. PATENT DOCUMENTS 6,068,418 A * 5/2000 Fox ............................... 400/579
7,111,806 B2 * 9/2006 Craig .......................... 242/608.7
(Continued)

FOREIGN PATENT DOCUMENTS

JP 2009208434 A * 9/2009 .............. B41J 15/04

OTHER PUBLICATIONS

International Search Report dated Sep. 5, 2013 for International Application No. PCT/US2013/031414 filed 14 Mar. 2013.

*Primary Examiner* — Daniel J Colilla
(74) *Attorney, Agent, or Firm* — Avery Dennison Retail Information Services, LLC

(57) ABSTRACT

An architecture is presented that provides a dual port printer device for printing food safety labels. The dual port printer accommodates multiple widths of supply rolls and comprises two ports for the printed labels to exit from and a touch panel screen. Specifically, the touch panel screen is positioned in the center of a pivoting front door, with the printed labels exiting lower on the door, below the touch panel screen. Further, the dual port printer device comprises removable supply flanges which easily accommodate any width of supply roll within its minimum and maximum width limits, and an adjustable loading chute which would direct the supply web from the supply roll to the printing module for printing of the labels.

15 Claims, 52 Drawing Sheets

(56) References Cited

U.S. PATENT DOCUMENTS

| | | |
|---|---|---|
| 2001/0000716 A1 | 5/2001 | Koshi et al. |
| 2005/0036819 A1 | 2/2005 | Monteith et al. |
| 2005/0286954 A1* | 12/2005 | Suzuki et al. ............... 400/613 |
| 2007/0009305 A1* | 1/2007 | Sakaino et al. ............... 400/613 |
| 2009/0214280 A1 | 8/2009 | Mistyurik et al. |
| 2011/0200375 A1 | 8/2011 | Kokawa et al. |
| 2011/0318080 A1 | 12/2011 | Hatanaka et al. |
| 2013/0088451 A1* | 4/2013 | Payne et al. .................. 345/173 |

* cited by examiner

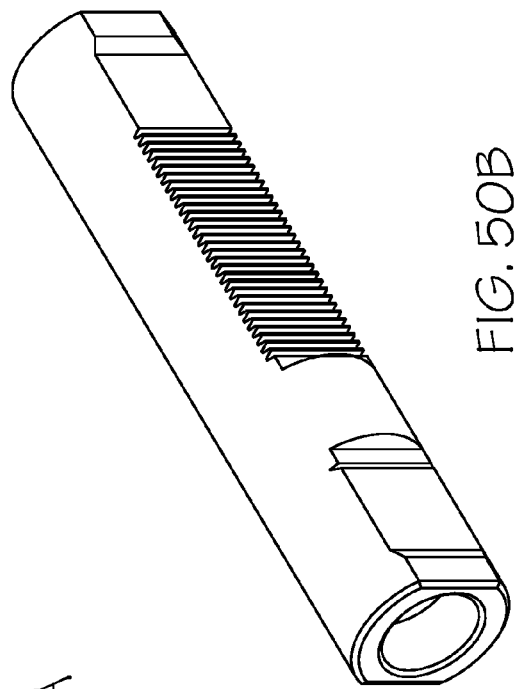
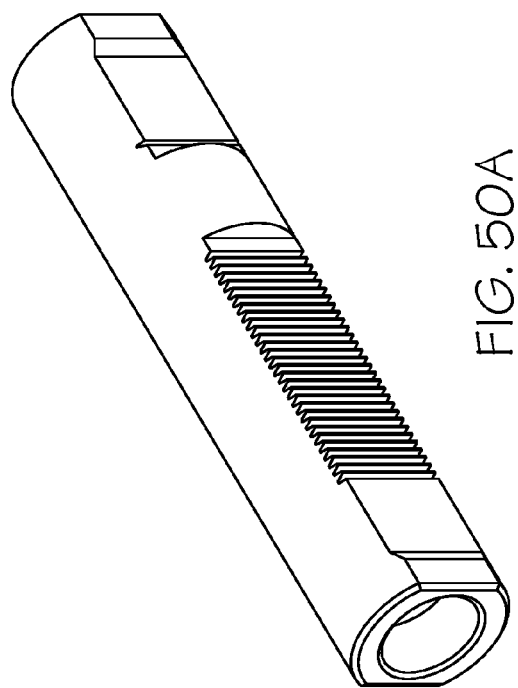

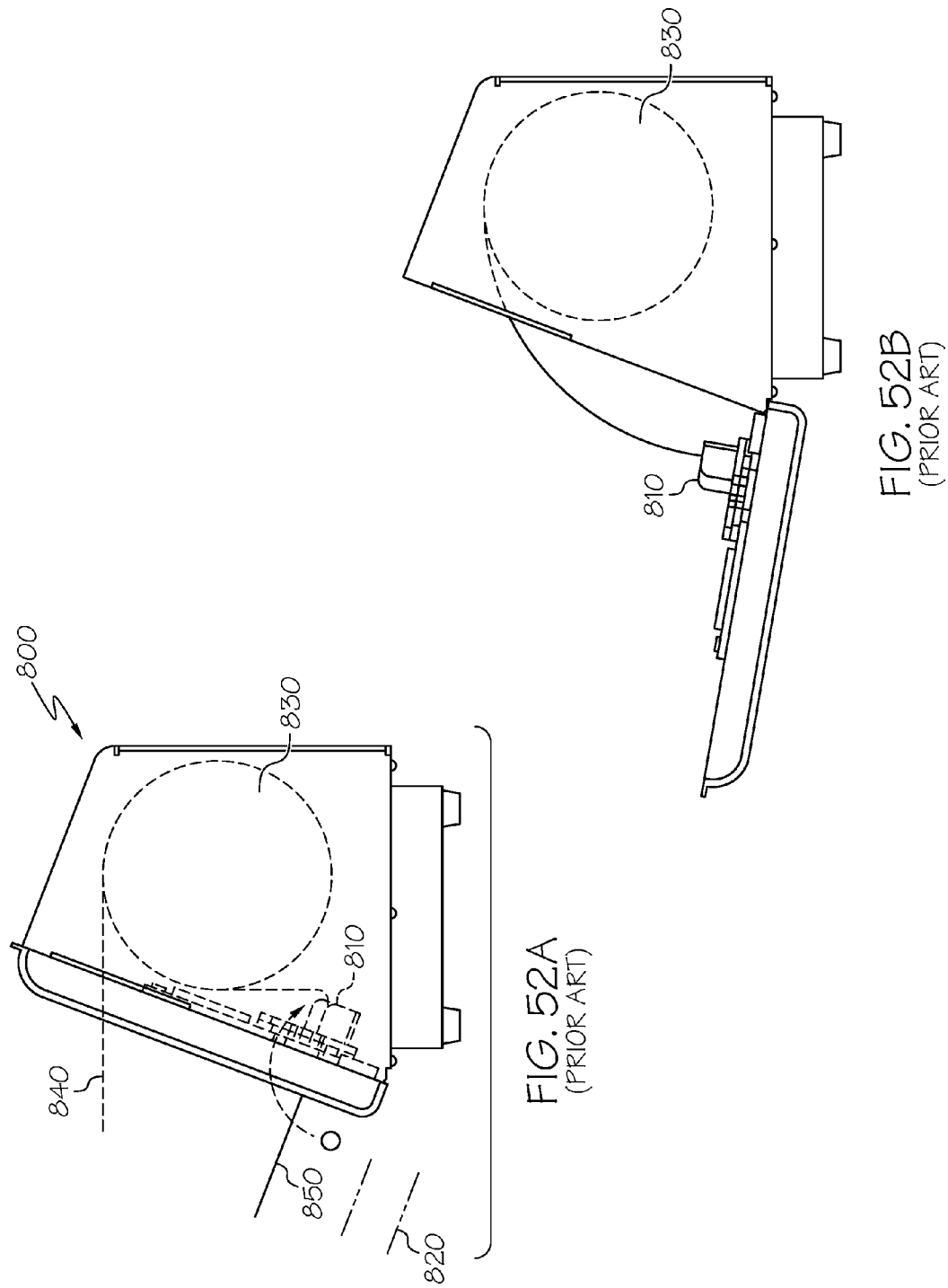

PRINTER WITH TOUCH PANEL AND LABEL EXIT ON DOOR

CROSS-REFERENCE TO RELATED APPLICATION

The present application claims the benefit of U.S. Provisional Patent Application No. 61/756,175 filed Jan. 24, 2013, which is incorporated herein by reference in its entirety.

BACKGROUND

Food safety labeling plays an important role in reducing pathogens that cause foodborne-illnesses by date coding foods. Date coding foods helps to control the growth of certain kinds of bacteria, such as *listeria monocytogenes*, which is a bacteria that continues to grow at refrigerated temperatures. Thus, the purpose of date coding is to ensure that food contaminated with this bacteria is discarded. However, current food safety labeling means disclose a unit that includes both a side-by-side touch panel display and a printing/supply handling portion, such that the existing printer units are rather large and create a wide footprint that takes up valuable counter space in the kitchen environment, where the printer is most often utilized. Further, the printing/supply handling portion is typically housed and retained on the front door section of most existing printer units, which makes the front door heavy and easy to tip the entire unit forward. Additionally, most existing printer units are designed to only accommodate two different widths of label supply rolls. Therefore, there is a continuing need for a printer device that can print labels or other stock of varying widths, and for a printer device with a relatively small overall footprint.

The present invention discloses a printer, having multiple outlets for printing media and which is used for printing food safety labels or other stock. The printer device of the present invention is capable of accommodating supply rolls of many differing widths, and includes in one exemplary embodiment two ports for the printed labels or other stock to exit from and a touch panel screen for relatively easy operation. It should be understood that while multiple or dual outlet ports are provided, the printer may be configured with only one media supply and utilize only one outlet.

Specifically, the touch panel screen is preferably positioned in the center of a pivoting front door, with the printed materials exiting the printer from a lower position along the door below the touch panel screen, which creates a printer device having a smaller width than prior art units and thus, a smaller overall footprint. Further, the printer device comprises removable supply flanges which easily accommodate any width of supply roll or multiple rolls within its minimum and maximum width limits, and an adjustable loading chute which directs the supply web from the supply roll to the printing module for printing of the labels or other stock.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a printer device for printing food safety labels or other stock that includes a hinged front door for ease in loading the supply rolls and may have one or more outlet ports. The printer accommodates multiple widths of supply rolls and in one embodiments includes two ports for the printed labels to exit from and a touch panel screen. Specifically, the touch panel screen is positioned in the center of the pivoting front door, with the printed labels exiting lower on the door, below the touch panel screen. Further, the printer device comprises removable supply flanges which easily accommodate any width of supply roll within its minimum and maximum width limits.

For example, a supply roll may be slid onto the center hub until the same rests against the fixed, inner supply flange to create an edge justified side. The outer supply flange is then slid onto the center hub and removably secured thereto to retain the supply roll in proper position for operation of the device. Once the supply roll is loaded onto the center hub and secured with a supply flange, the user then pivots the support assembly back into the printer housing cavity. The user then loads the supply web from the roll into the loading chute. However, the supply web can be loaded into the loading chute either before or after the support assembly is pivoted back into the printer housing cavity.

In a preferred embodiment, the printer device further comprises a locklever and a user can adjust the width of the loading chute by moving the locklever to an unlocked position. Once the locklever is in an unlocked position, the user can then horizontally slide the supply guide/locklever assembly along the guide track to adjust the width of the supply guide and loading chute to accommodate variable width supply rolls. Once the desired width is reached, the user then rotates the locklever approximately 90 degrees clockwise or counter-clockwise to a locked position. Once the width is adjusted and the locklever secured and in a locked position, the user would then feed the supply web into the load chute opening. The transfer roller would contact the supply web and direct it into the printing module and the user would then close the front door of the device and begin printing.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIGS. 37-49 illustrate views of the dual port printer device and a user loading the printer device with supply rolls in accordance with the disclosed architecture.

FIGS. 50A and 50B illustrates additional views of the supply flange in accordance with the disclosed architecture.

FIGS. 52A and B illustrate the engagement of a transfer roller into a supply path for a dual port printer device of the present invention.

DETAILED DESCRIPTION

Figure 1:
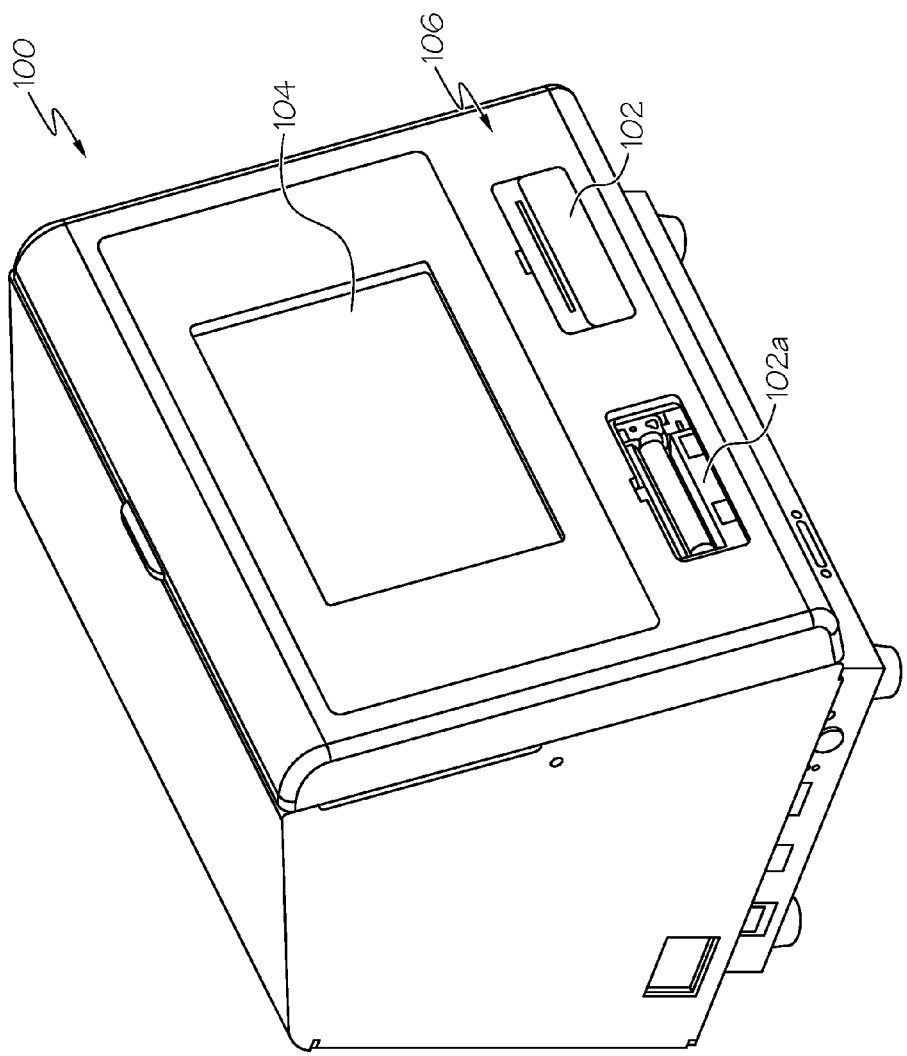
FIG. 1 illustrates a perspective view of a printer device with the front door closed in accordance with the disclosed architecture.
Figure 2:
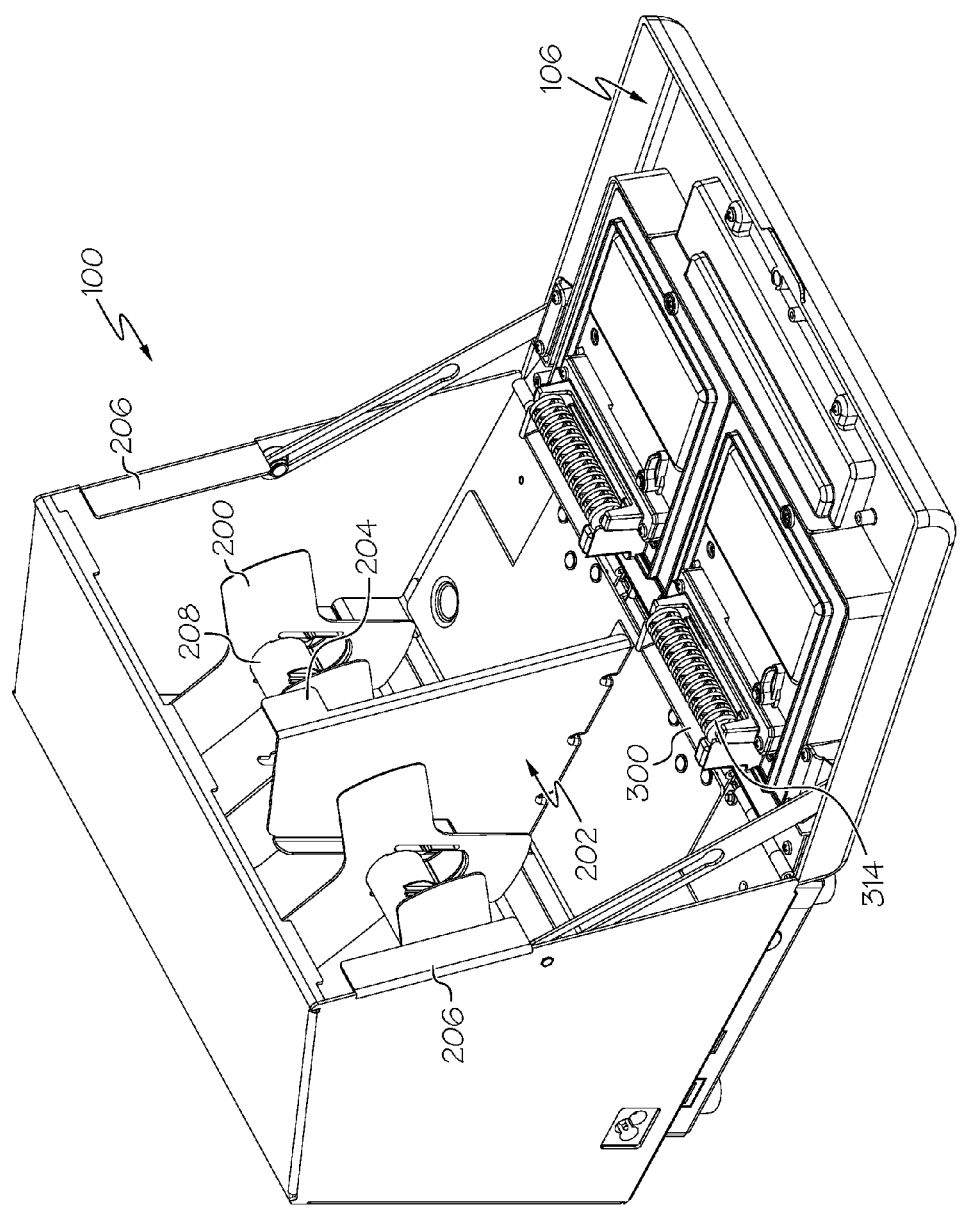
FIG. 2 illustrates a perspective view of the dual port printer device with the front door open in accordance with the disclosed architecture.
Figure 3:
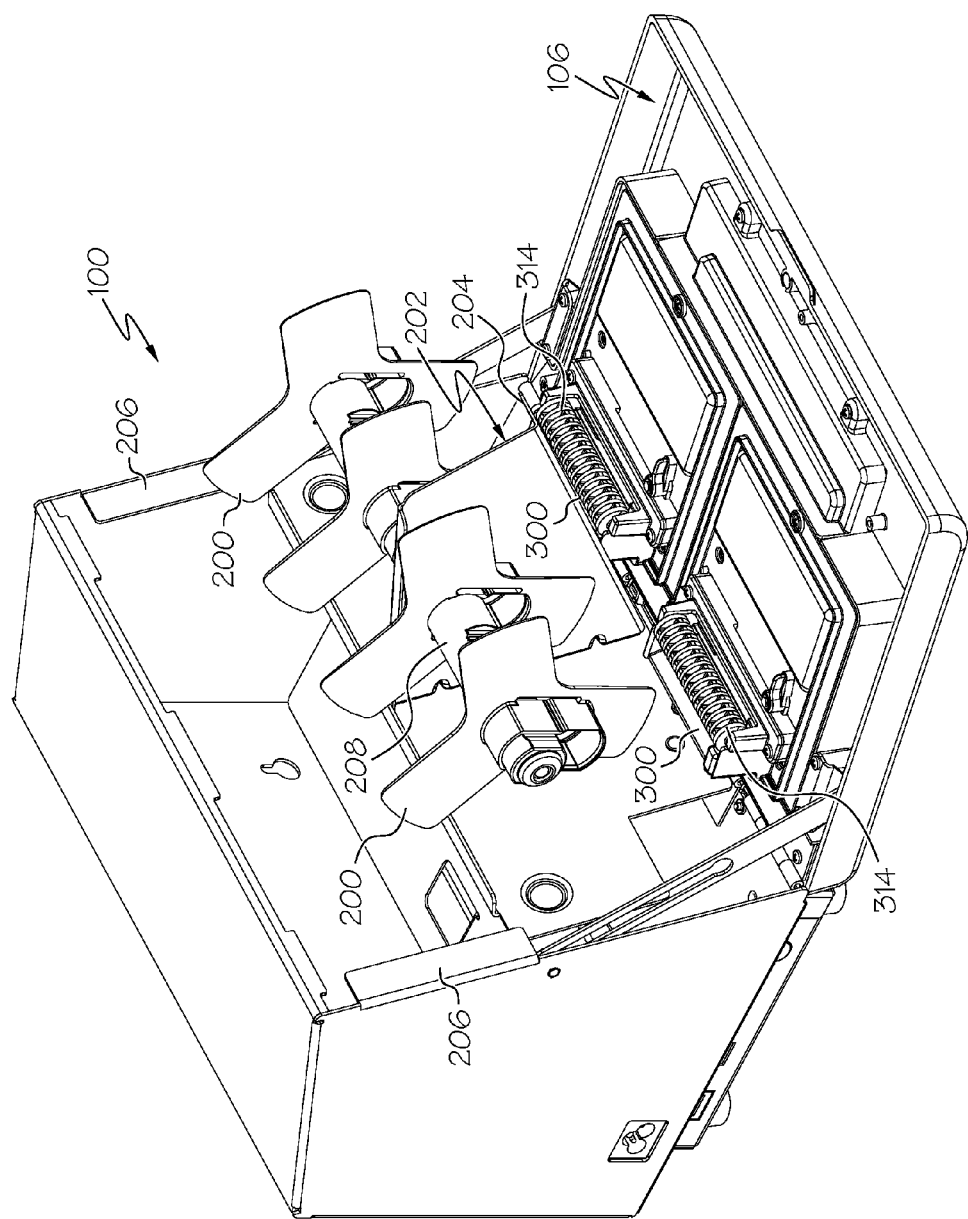
FIGS. 3-8 illustrate a perspective view of the dual port printer device with the front door open and the inner supply support assembly pivoted out and a supply roll being loaded and secured in accordance with the disclosed architecture.
Figure 4:
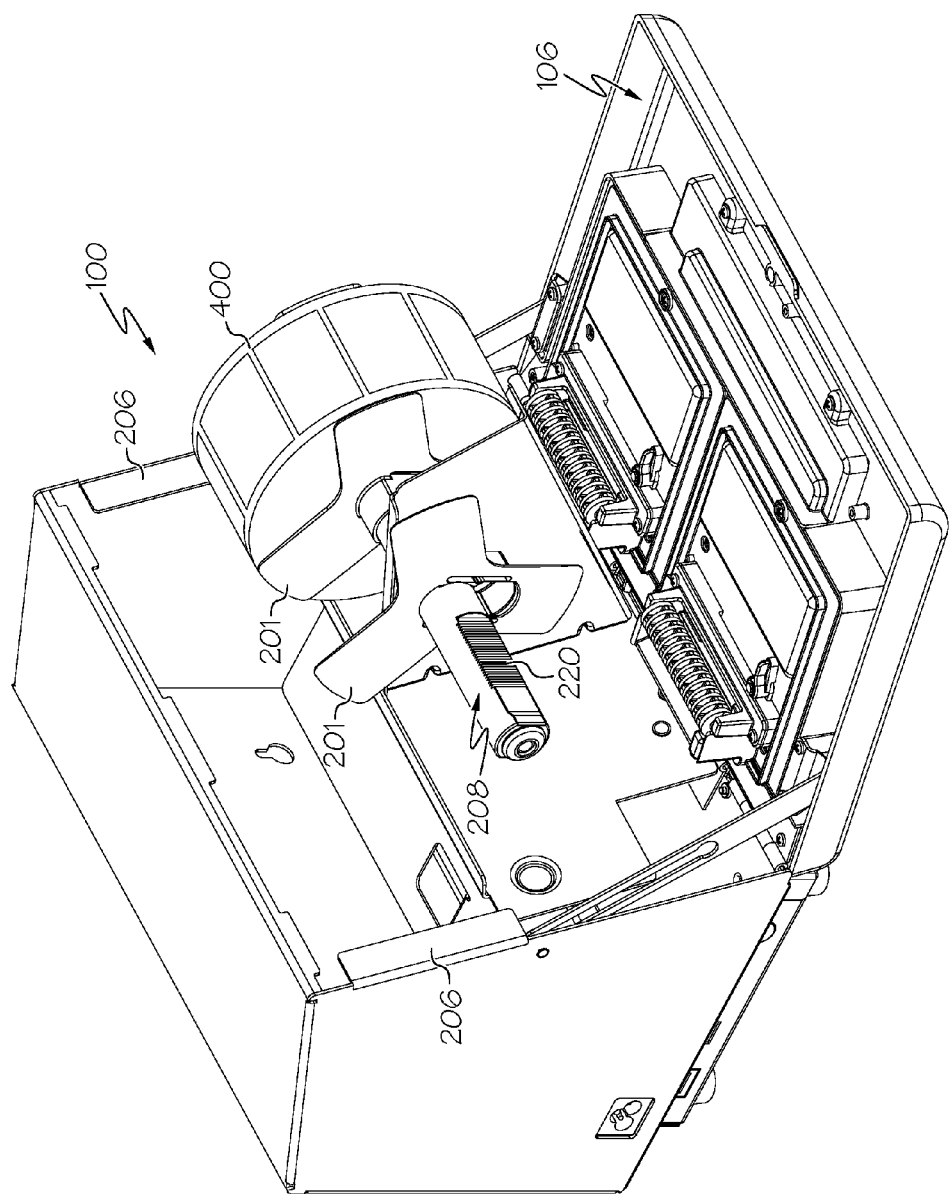
Figure 5:
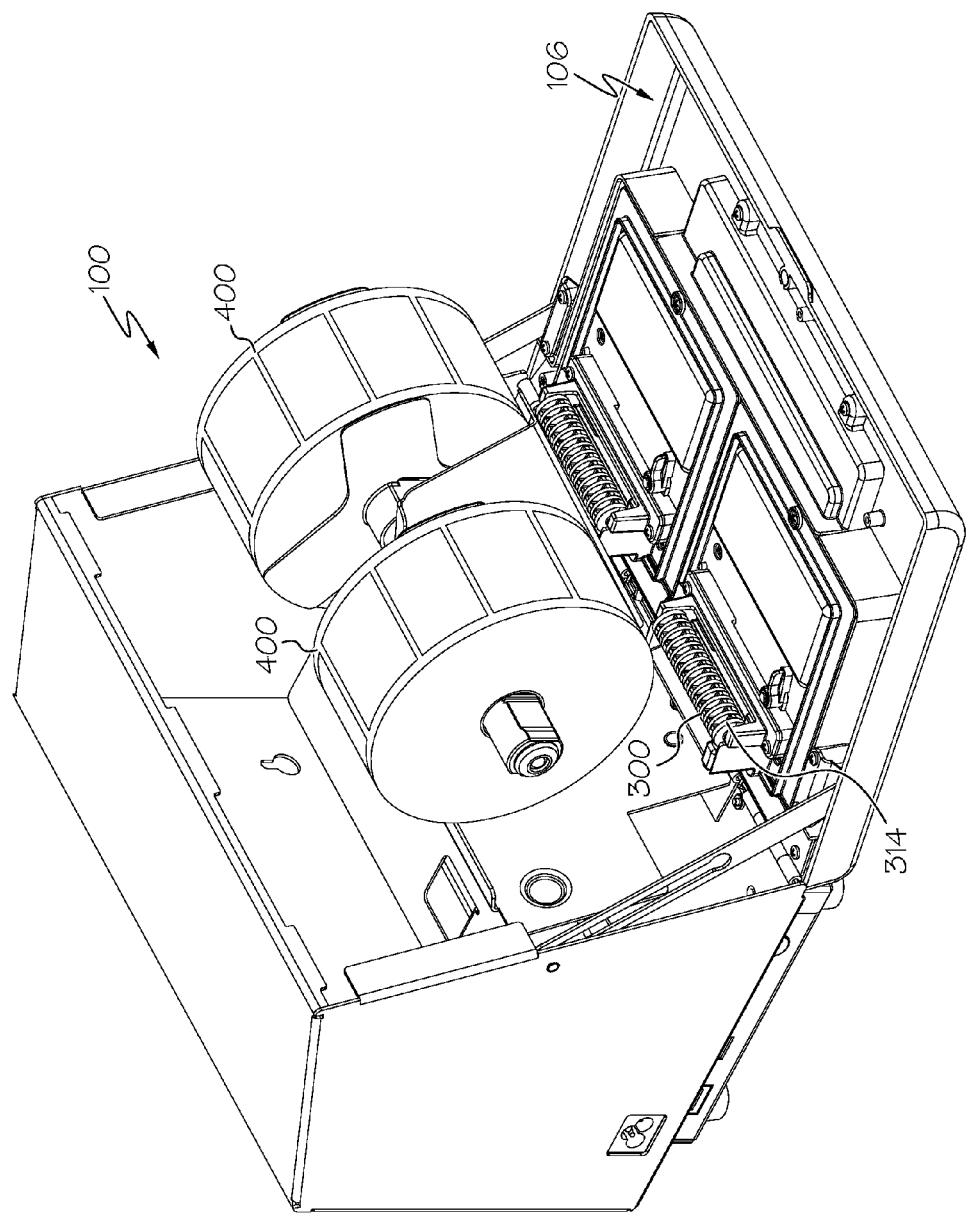
Figure 6:
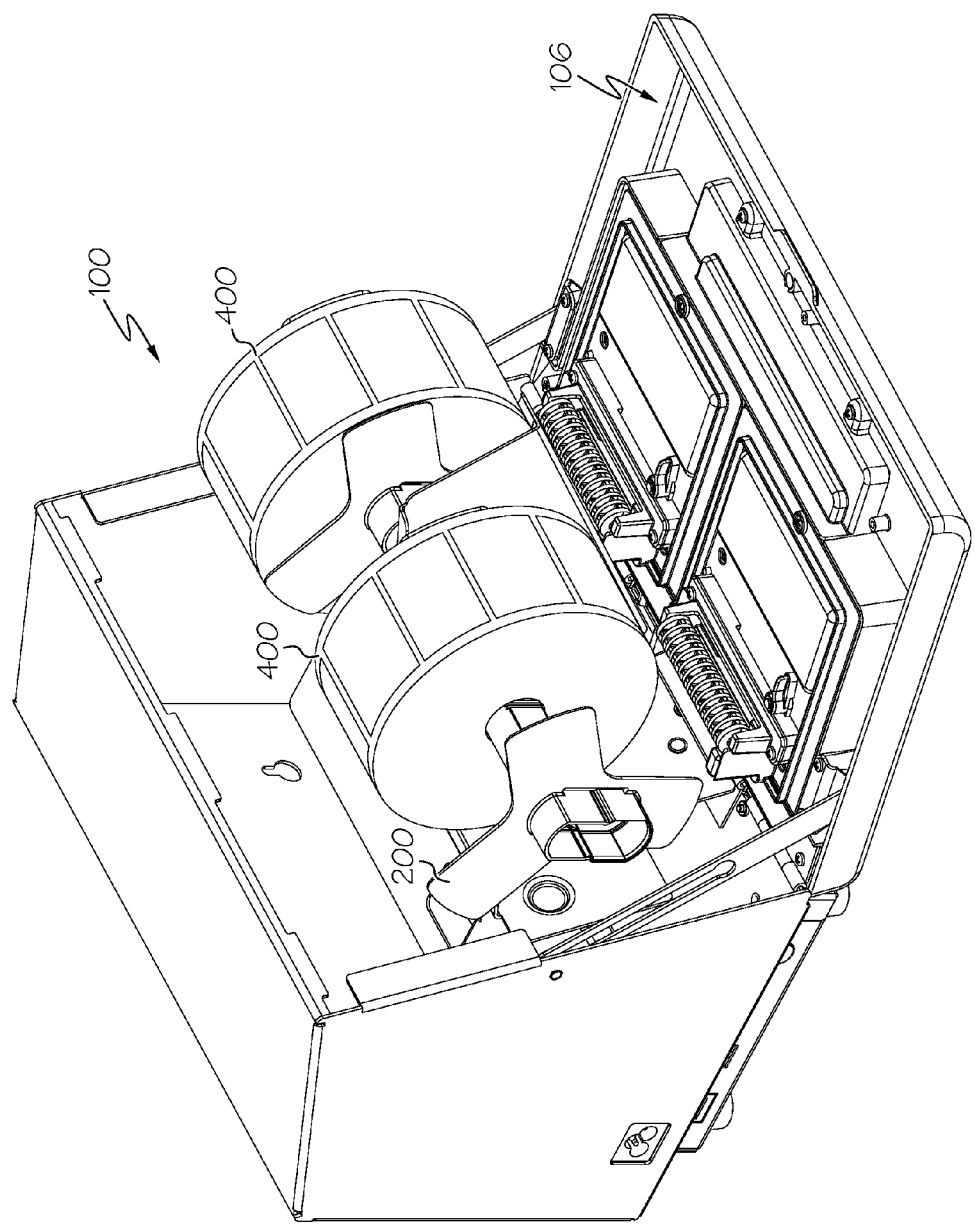
Figure 7:
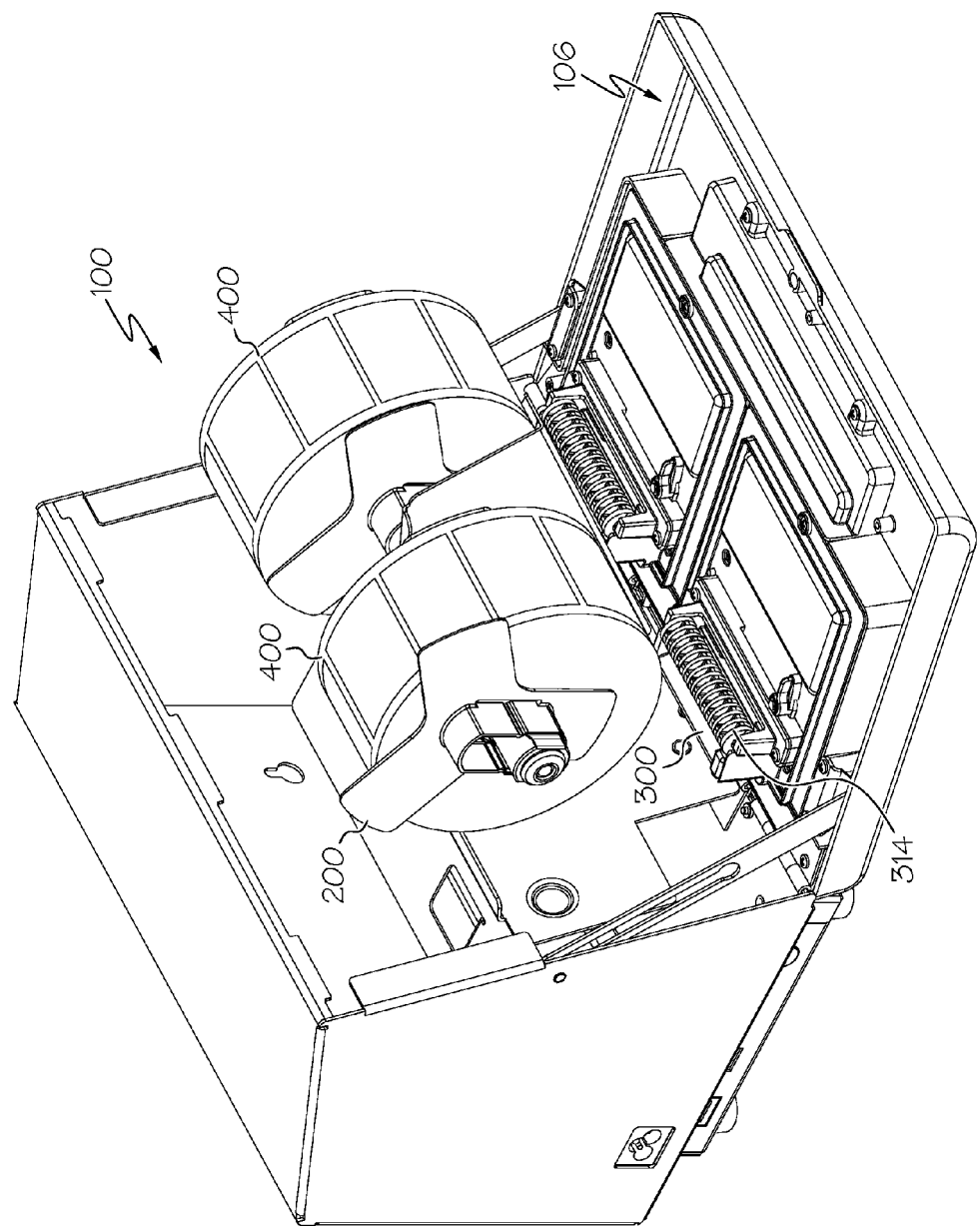
Figure 8:
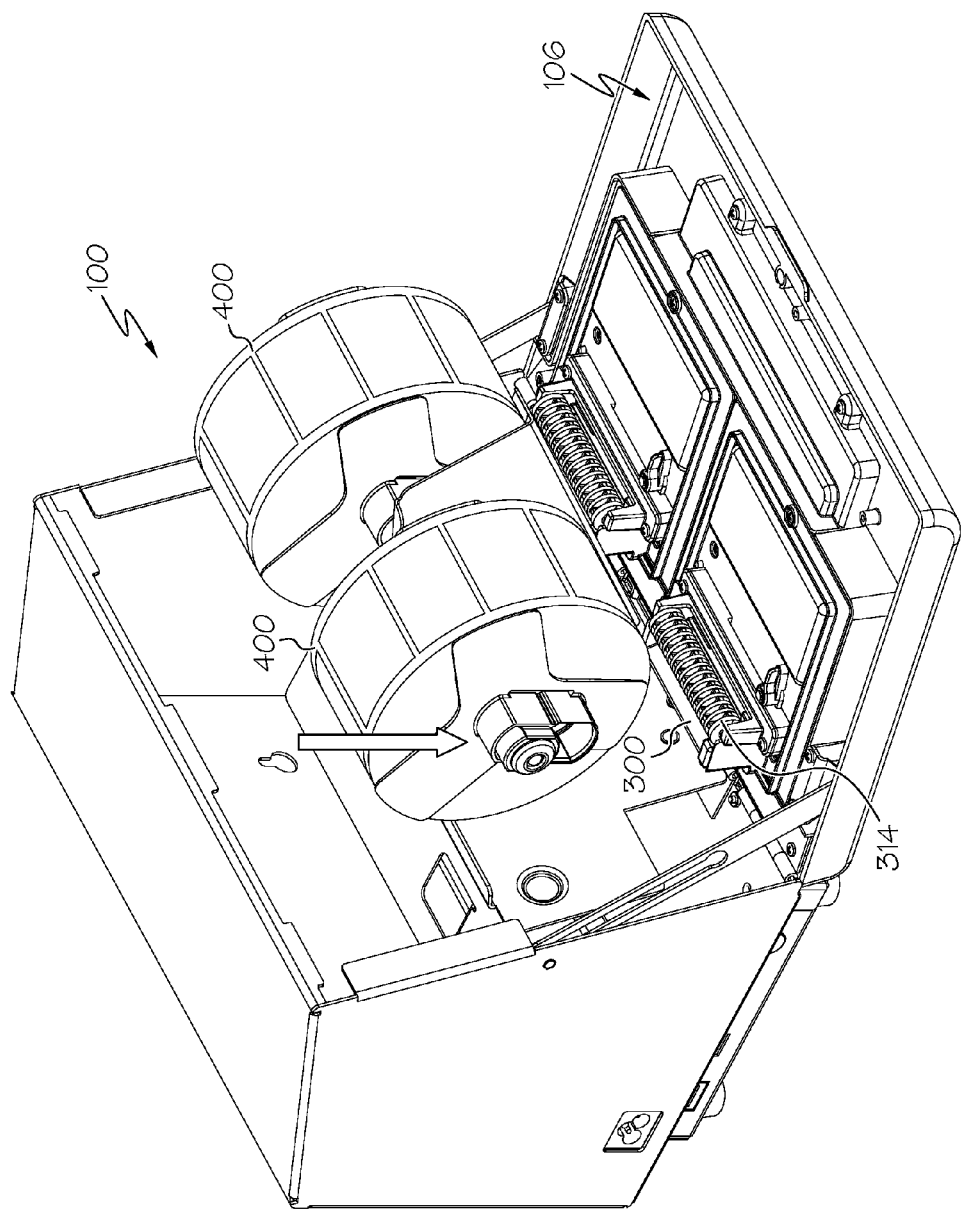
Figure 9:
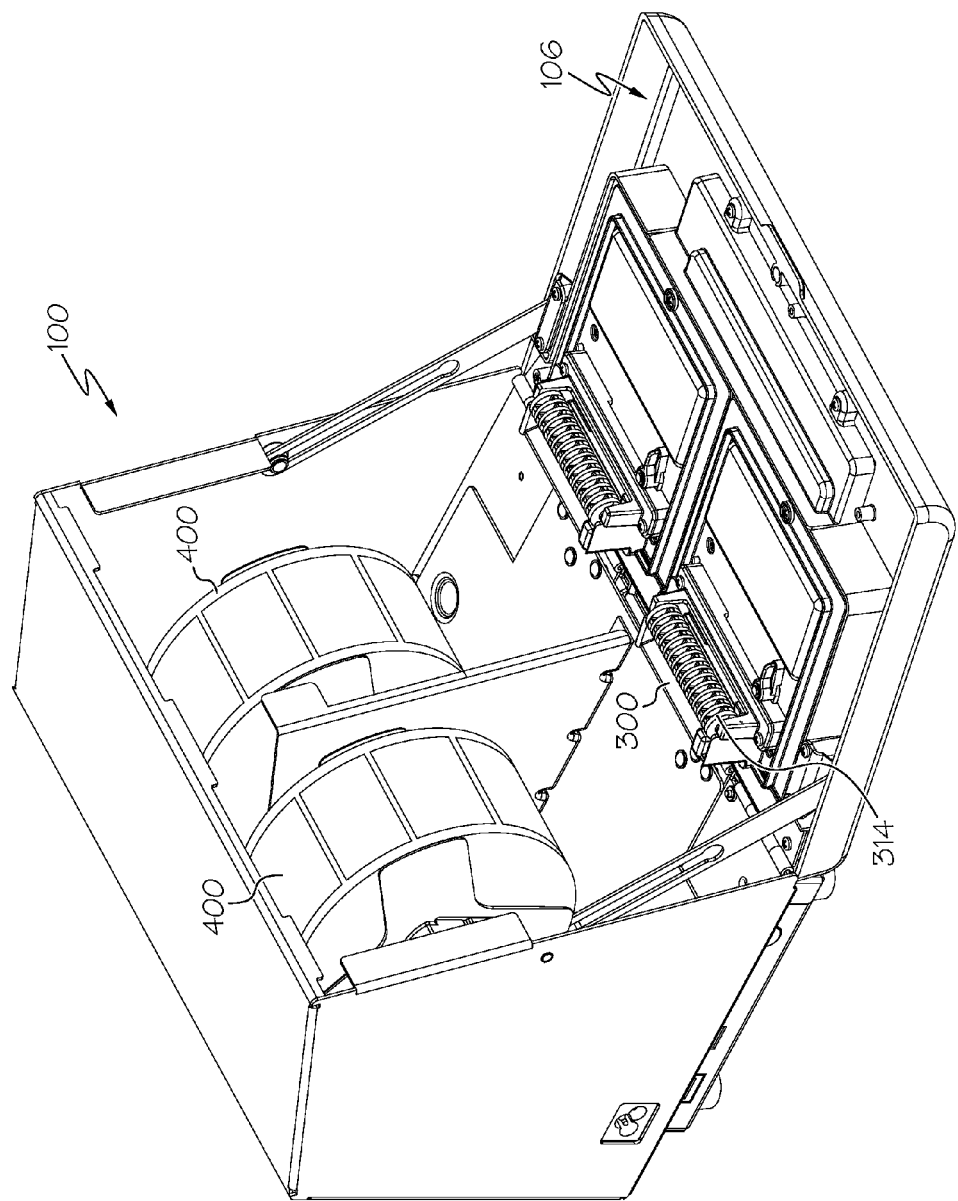
FIG. 9 illustrates a perspective view of the dual port printer device with the front door open and the inner supply support assembly pivoted back into the interior of the printer device in accordance with the disclosed architecture.
Figure 10:
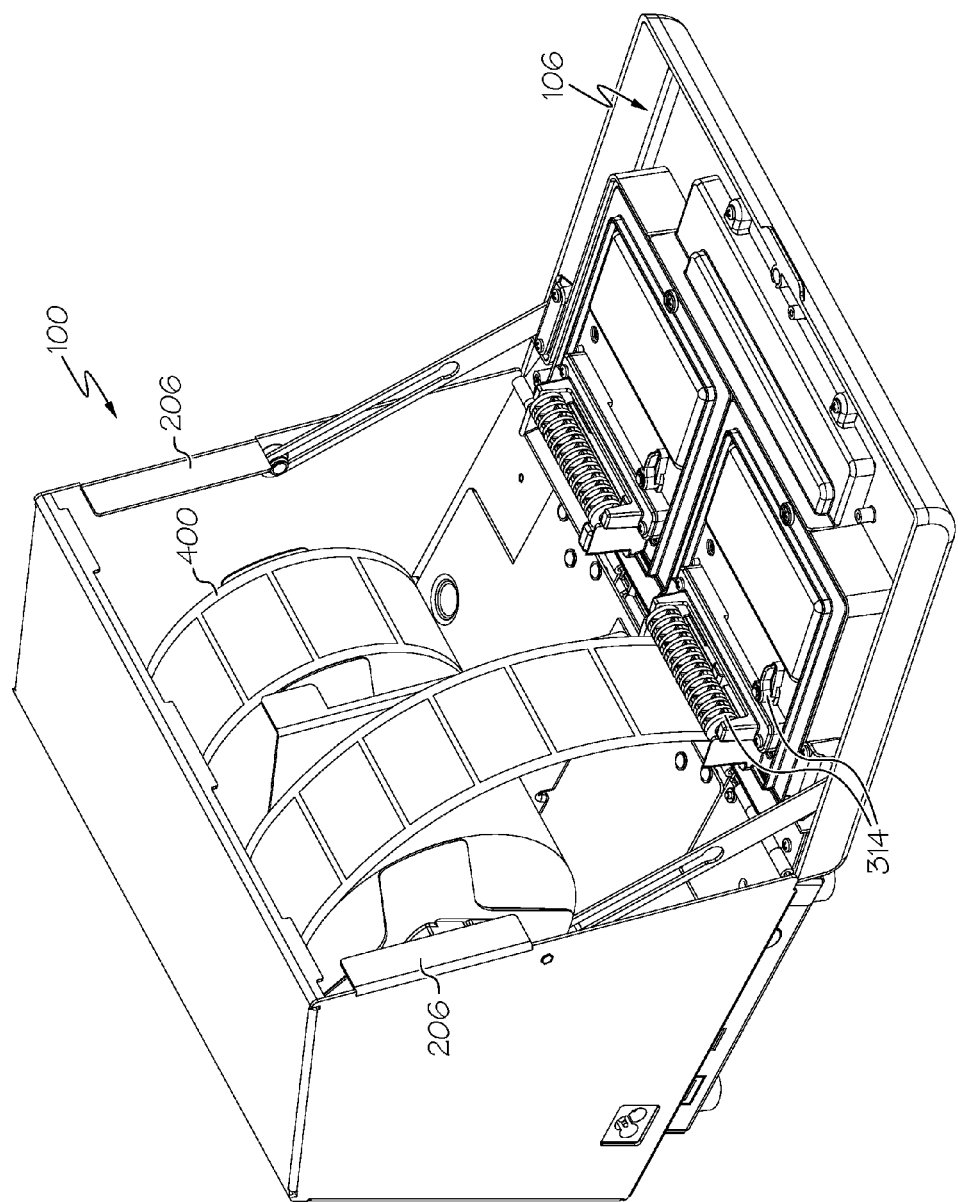
FIG. 10 illustrates a perspective view of the supply web of the supply roll loaded into the load chute in accordance with the disclosed architecture.
Figure 11:
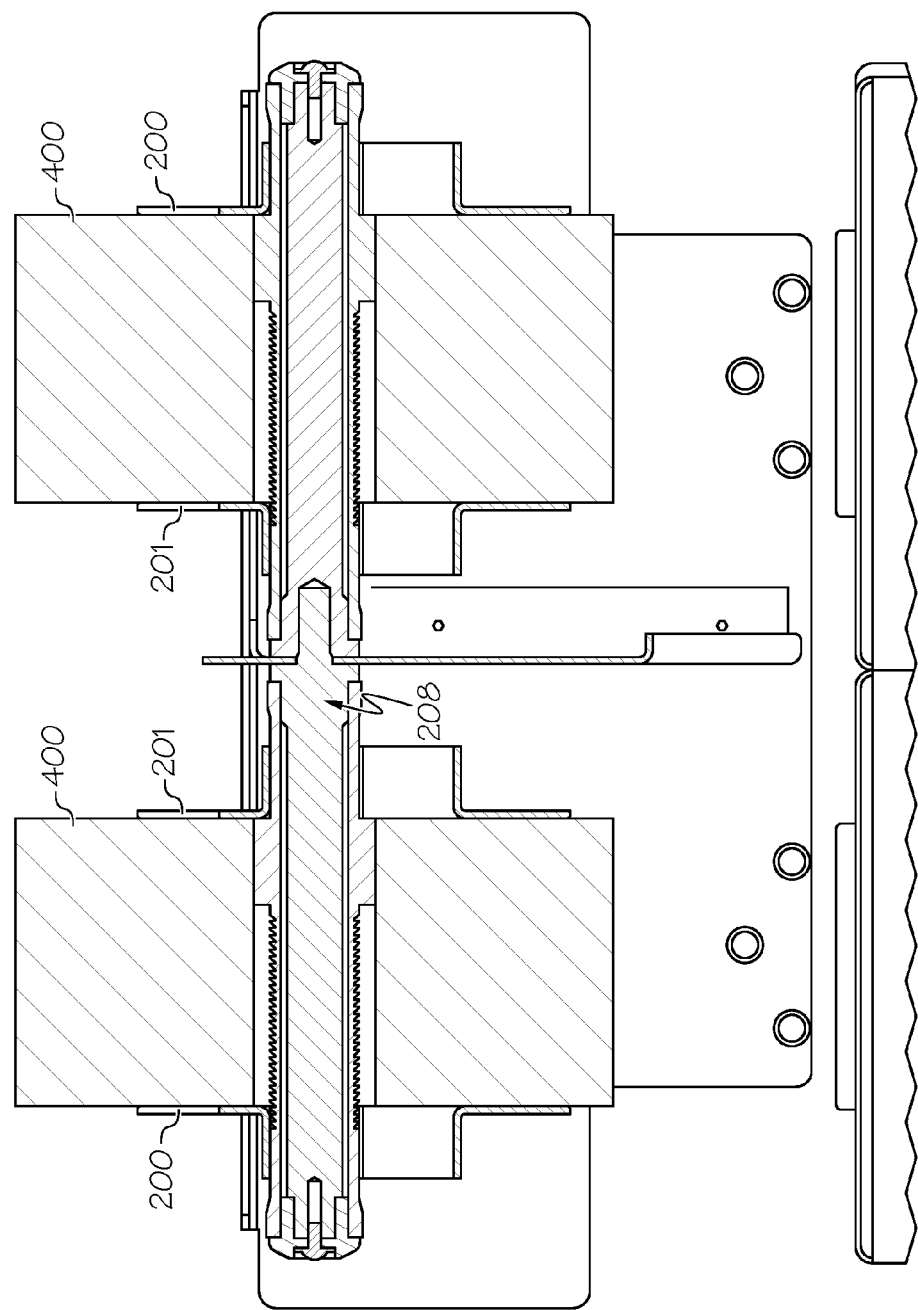
FIGS. 11-12 illustrate a top section view of the interior of the dual port printer device, showing the supply rolls and center hub in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a printer device which may have more than one port for printing food safety labels or other materials. The printer accommodates multiple widths of supply rolls and in one embodiment has two ports for the printed materials to exit from, and a touch panel screen. Specifically, the touch panel screen is preferably positioned in the center of a pivoting front door, with the printed labels exiting through openings in the door below the touch panel screen, which creates a printer device having a smaller width than prior art units and thus, a smaller overall footprint. Further, the dual port printer device comprises removable supply flanges which easily accommodate any width of supply roll within its minimum and maximum width limits, and an adjustable loading chute which directs the supply web from the supply roll to the printing module for printing.

Referring initially to the drawings, FIG. 1 illustrates a dual port printer device 100 for printing food safety labels or other materials that includes a hinged front door 106 for ease in loading the supply rolls. The printer 100 accommodates multiple widths of supply rolls and comprises two ports 102 and 102a for the printed labels to exit from and a touch panel screen 104. In a preferred embodiment, the touch panel screen 104 is positioned in the center of the pivoting front door 106, with the printed labels exiting lower on the door 106, below the touch panel screen 104. In the prior art, the supply web would have to exit the printer at a relatively high point on the printer door. However, due to the transfer roller 810 of the present invention being located on the printer door 820, the supply web is able to exit and enter the printer at a relatively lower point 850 on the printer door 820 than the previous printers. The transfer roller 810 on the printer door is pivoted into a position in the printer 800 upon closure of the printer door 820 in order to change direction of the supply web 830 into the loading path. By having the transfer roller 810 on the printer door it negates the need to thread the supply web under the transfer roller which would be required if the transfer roller 810 was located on the supply support. FIG. 52 illustrates the transfer roller 810 entering the supply path to change direction for entry into the printing module. The transfer roll being on the printer door is advantageous as it allows end users to easily utilize supply webs from previous printers known as legacy supplies.

In other embodiments contemplated by the present invention the touch panel screen 104 and ports 102 can be positioned anywhere on the front door 106 depending on user and manufacturing needs/preferences. The pivoting front door 106 of the printer 100 pivots open to allow for access to the supply rolls.

Furthermore, as shown in FIGS. 2-16, the dual port printer 100 comprises removable supply flanges 200 which easily accommodate any width of supply roll 400 within its minimum and maximum width limits. Specifically, the supply rolls 400 are loaded via opening the hinged front door 106 and pivotally rotating the inner supply support assembly 202 toward the user, such that the supply rolls 400 are easily accessed. However, the front door 106 does not have to be hinged or pivoted and can utilize any opening mechanism as is known in the art, such as by sliding open, swinging open, etc. Further, the inner supply support assembly 202 is independently pivotable from the hinged front door 106 and divorced from the transfer roller 314 and loading chute 300. Thus, after the hinged front door 106 is opened, the inner supply support assembly 202 can then be pivoted out from the interior of the printer 100 toward the user, for easy supply roll 400 loading, and then pivoted back away from the user and into the interior of the printer 100. Having the inner supply support assembly 202 independently pivotable from the hinged front door 106 removes excess weight from the hinged front door 106, and allows for easy access to load the supply web from the supply rolls 400 into the loading chute 300 which is located on the still open hinged front door 106.

Furthermore, the inner supply support assembly 202 comprises a tab 204 for a user to grab to pivot the support assembly 202 toward the user. Additionally, the edges of the interior of the dual port printer 100 comprise a stop feature 206 which limits the pivoting distance of the inner supply support assembly 202. Specifically, a user grasps the tab 204 and pivots the inner supply support assembly 202 toward the user until it contacts the stop feature 206 located on opposing sides of the interior of the dual port printer 100. The stop feature 206 prevents the support assembly 202 from being rotated any further. Once the support assembly 202 is pivoted over its center of gravity, the support assembly 202 will remain in an open position, allowing the user to easily load supply rolls 400 onto the center hub 208. Furthermore, the pivoting front door 106 and the support assembly 202 typically share a pivot axis, with just a set of separate hinges for each. However, sharing a pivot axis is not necessary and the dual port printer 100 can function with the front door 106 and the support assembly 202 having separate pivot axis's.

Figure 12:
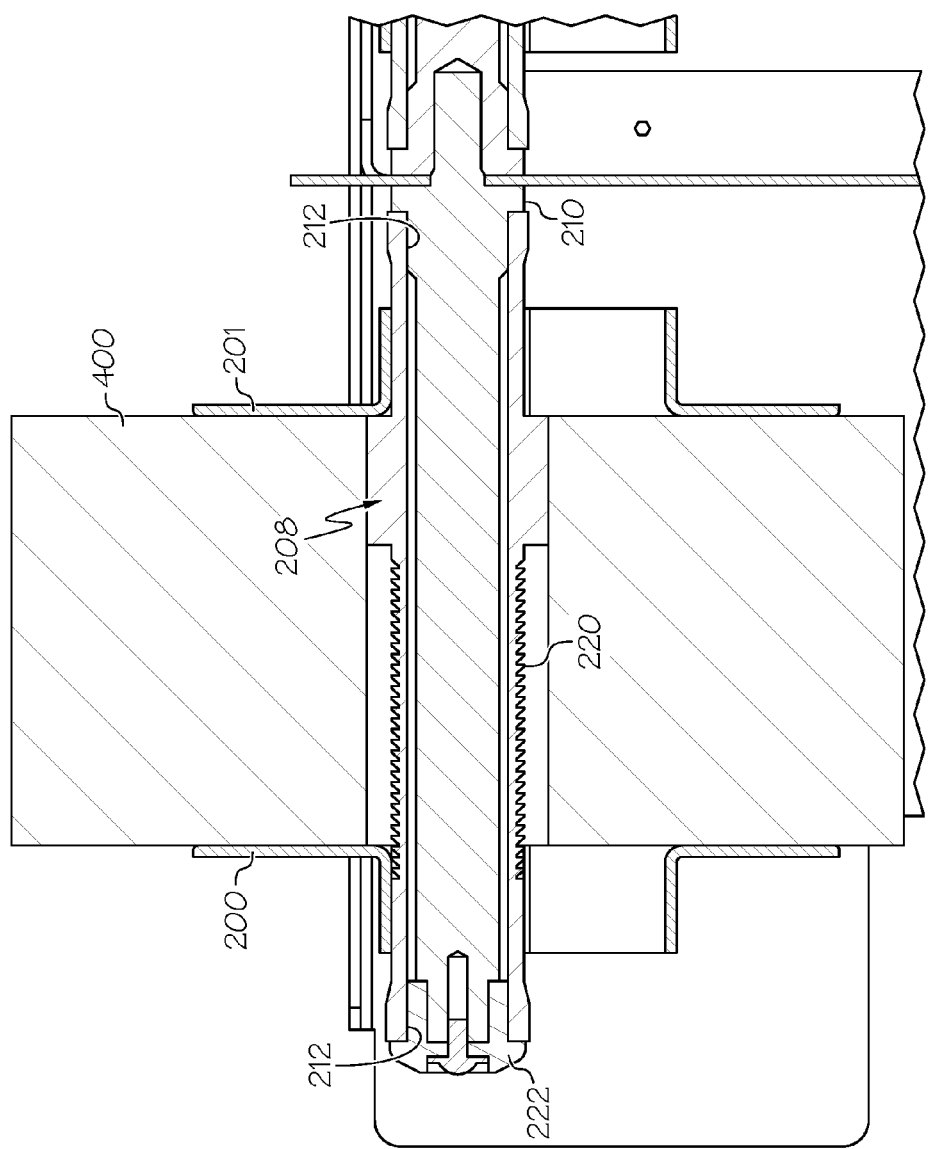
Figure 13:
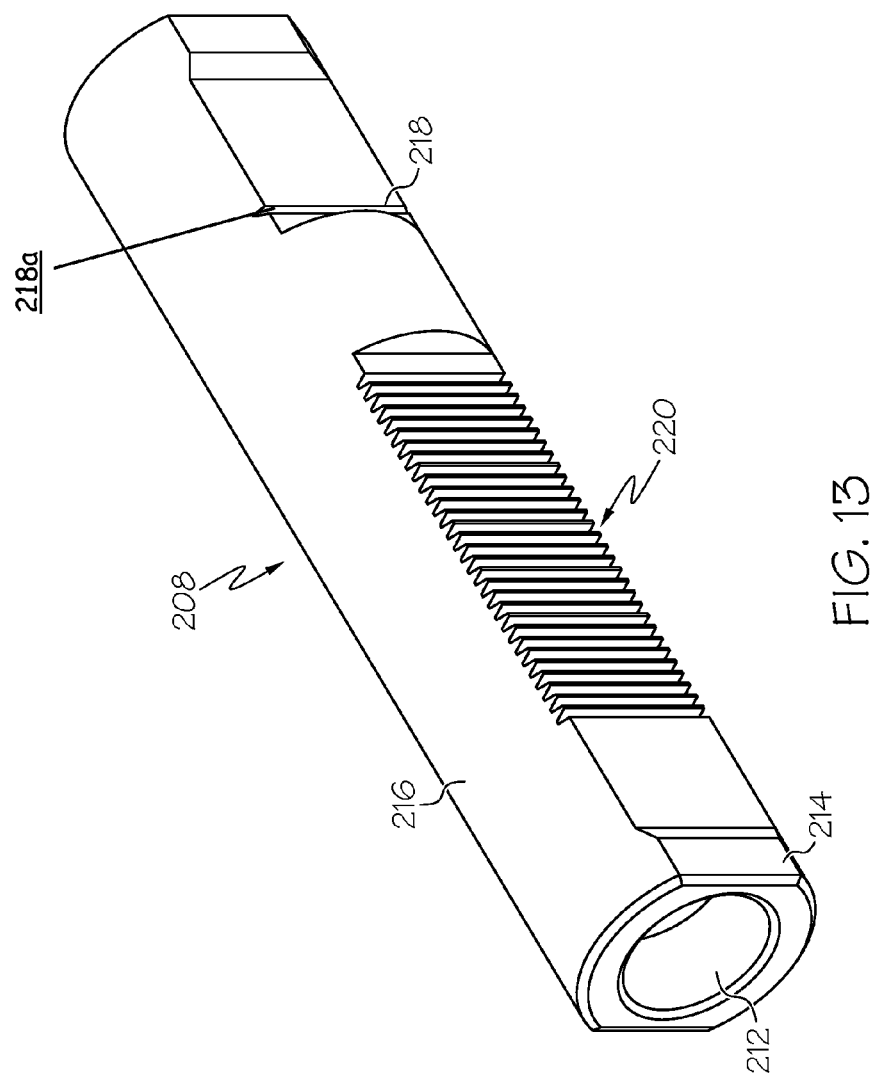
FIG. 13 illustrates a perspective view of the center hub in accordance with the disclosed architecture.
Figure 14:
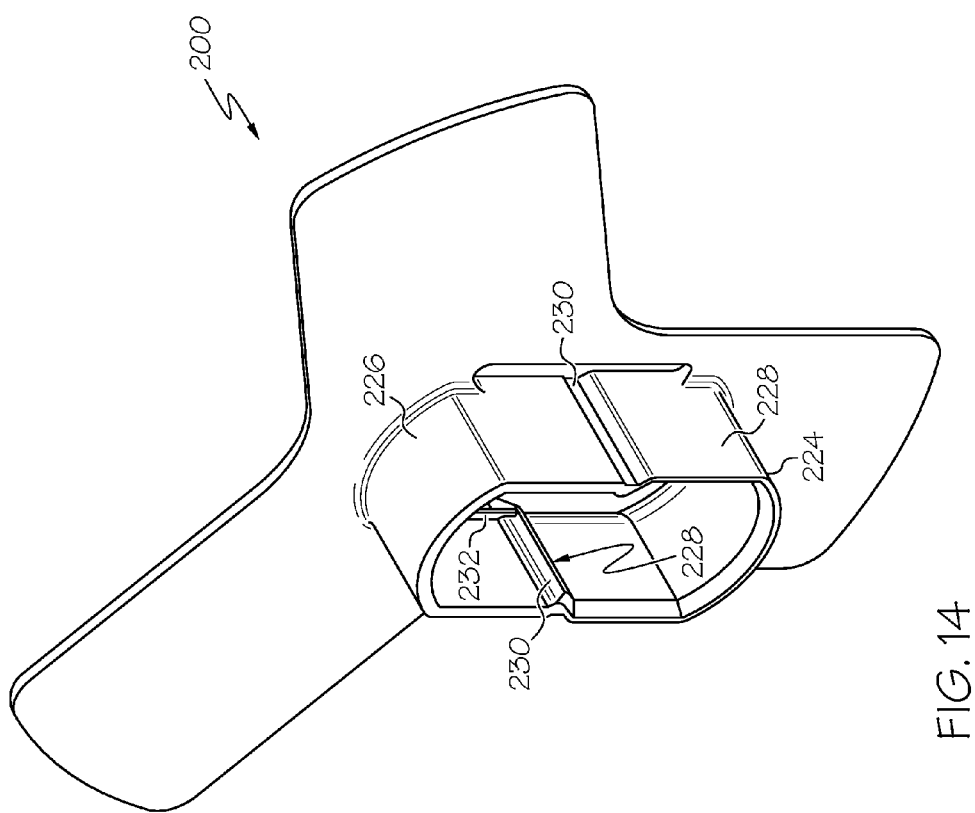
FIG. 14 illustrates a perspective view of the supply flange in accordance with the disclosed architecture.
Figure 15:
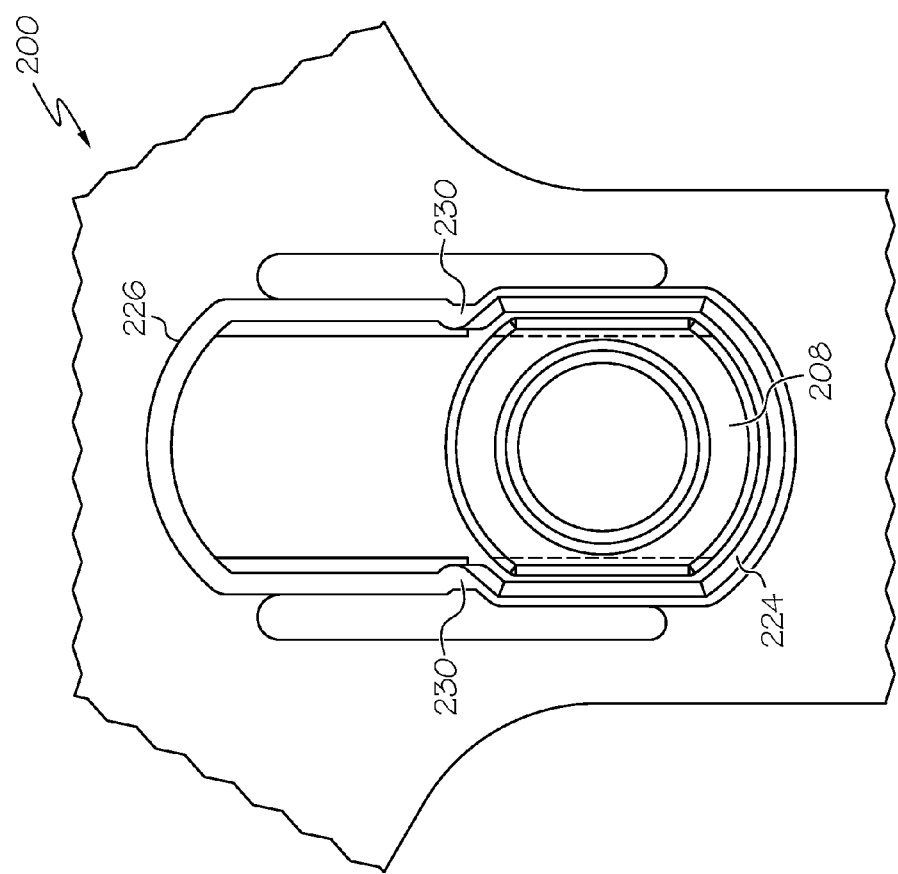
FIGS. 15-16 illustrate a front view of the supply flange in accordance with the disclosed architecture.
Figure 16:
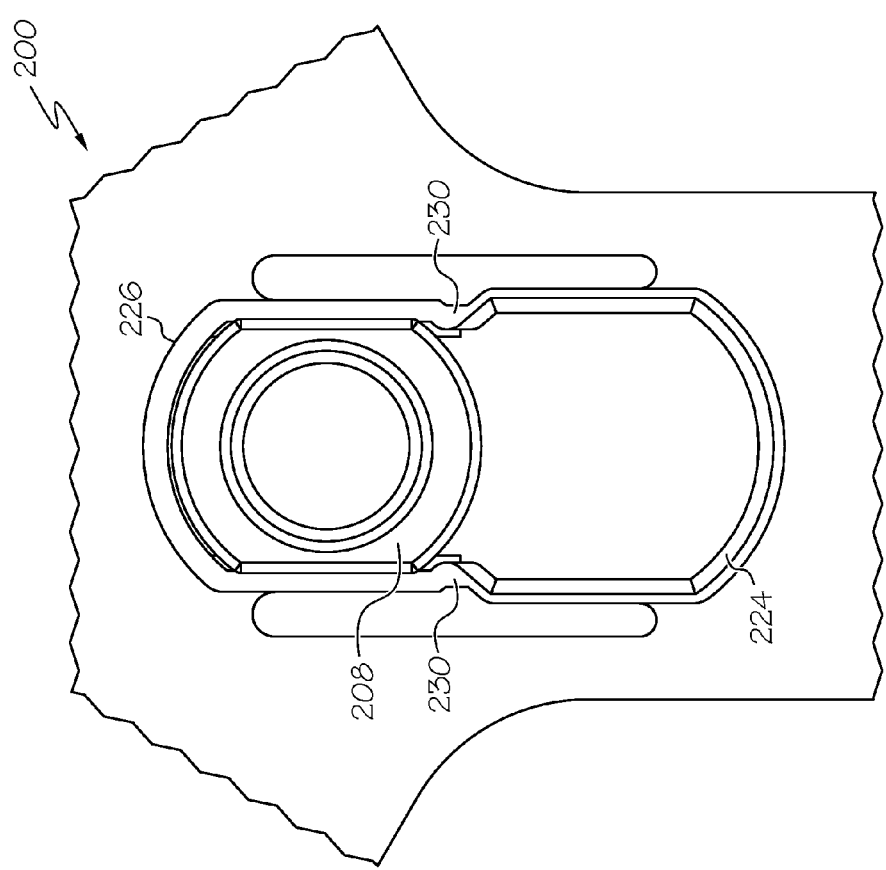
Figure 17:
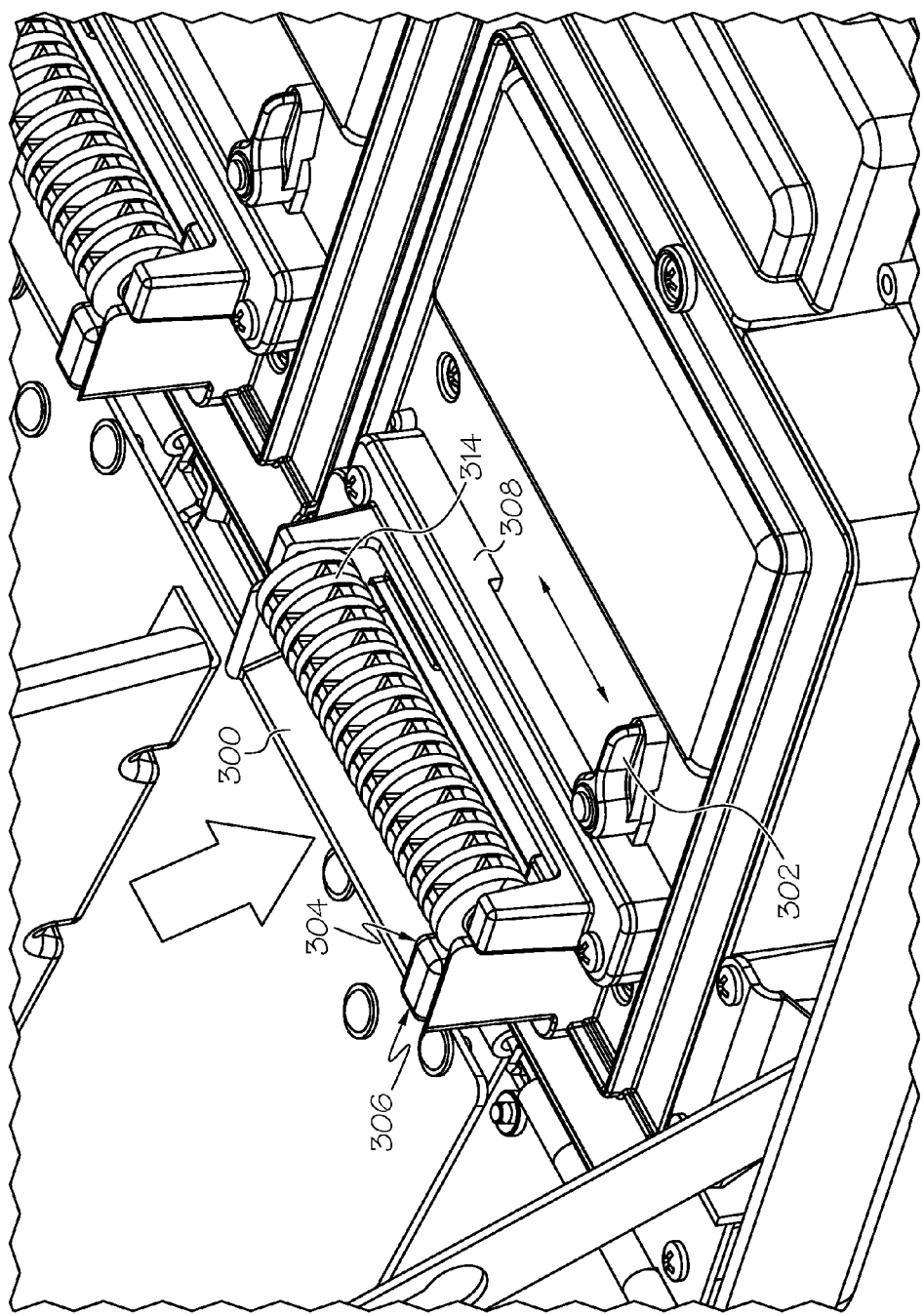
FIG. 17 illustrates a perspective view of the transfer roller and load chute in accordance with the disclosed architecture.
Figure 18:
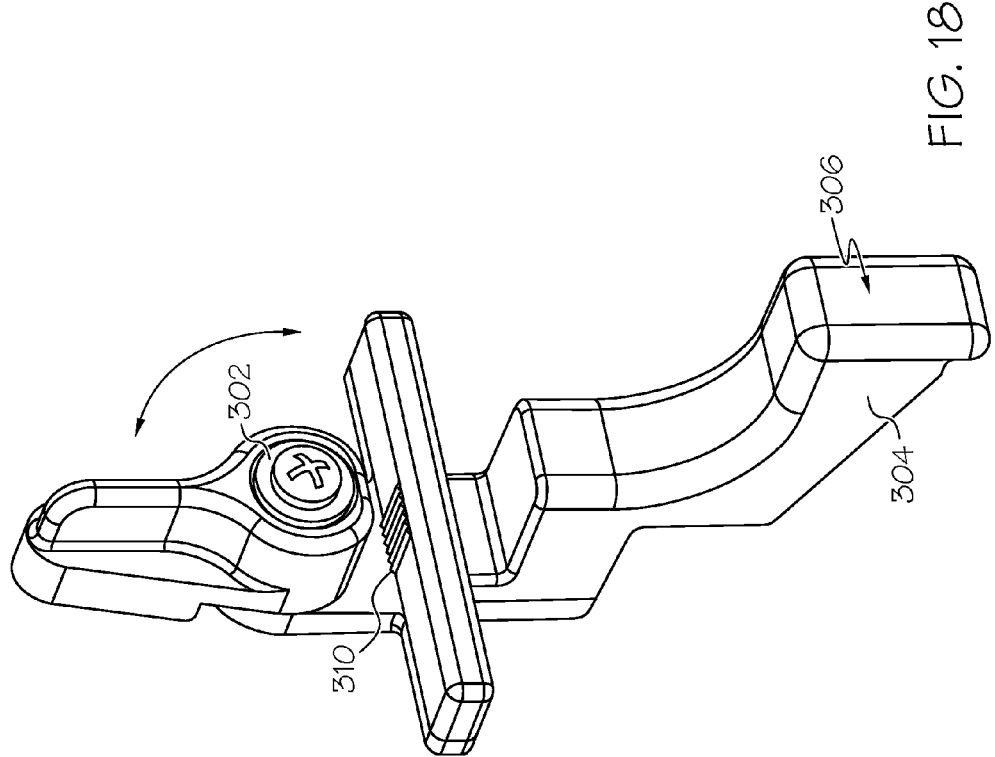
FIGS. 18-19 illustrate a perspective view of the locklever and guide track in accordance with the disclosed architecture.
Figure 19:
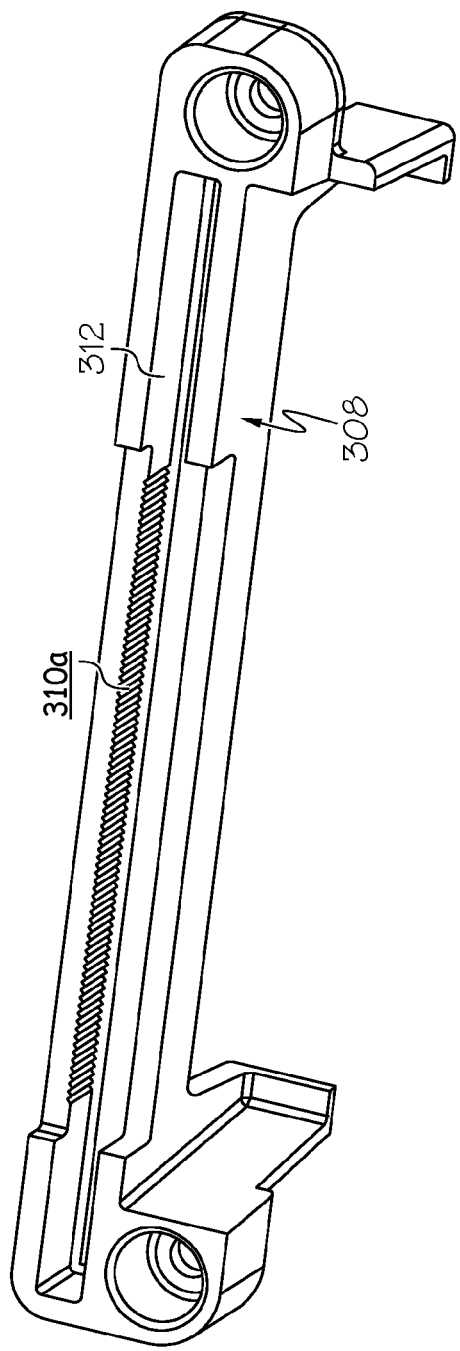
Figure 20:
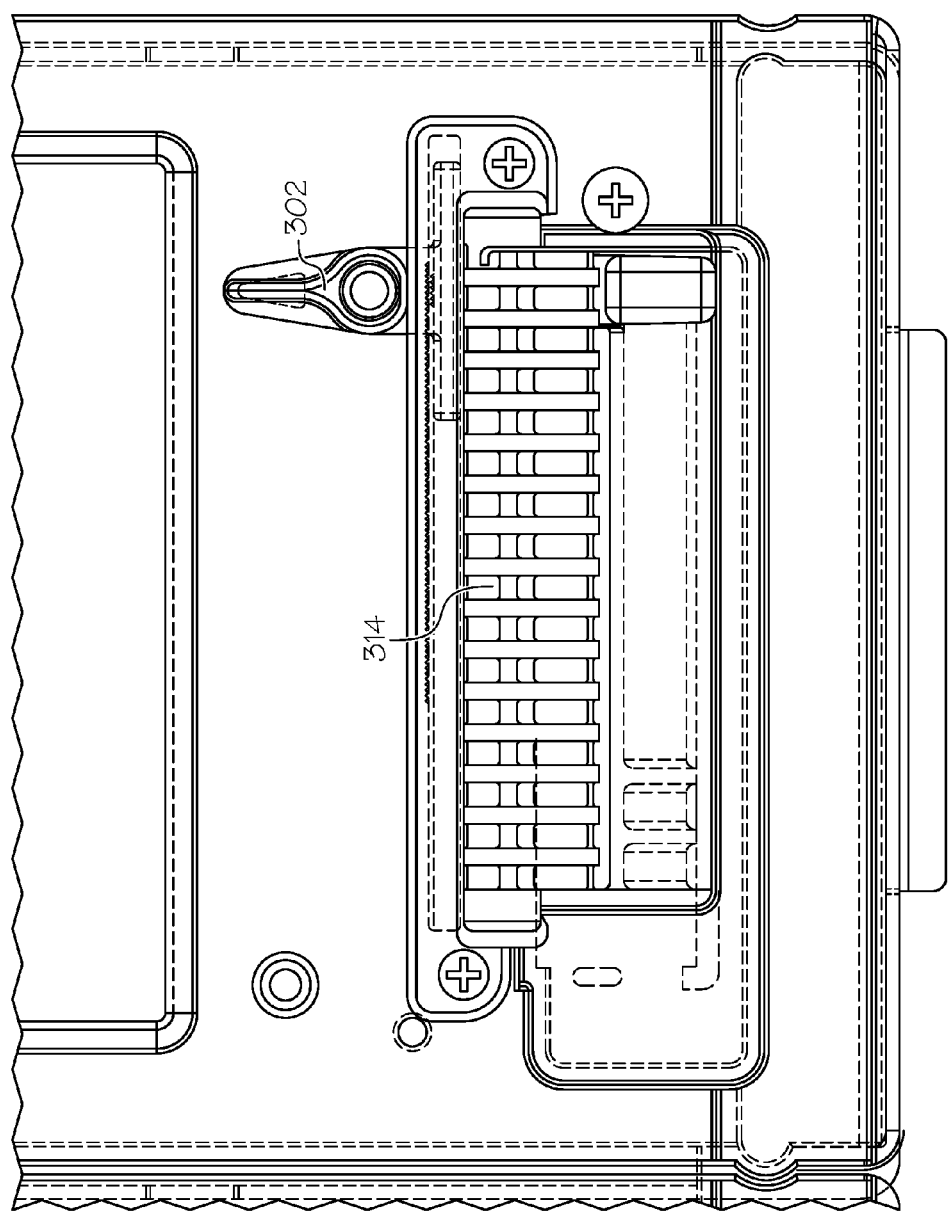
FIGS. 20-21 illustrate a front view of the transfer roller and load chute and locklever in accordance with the disclosed architecture.
Figure 21:
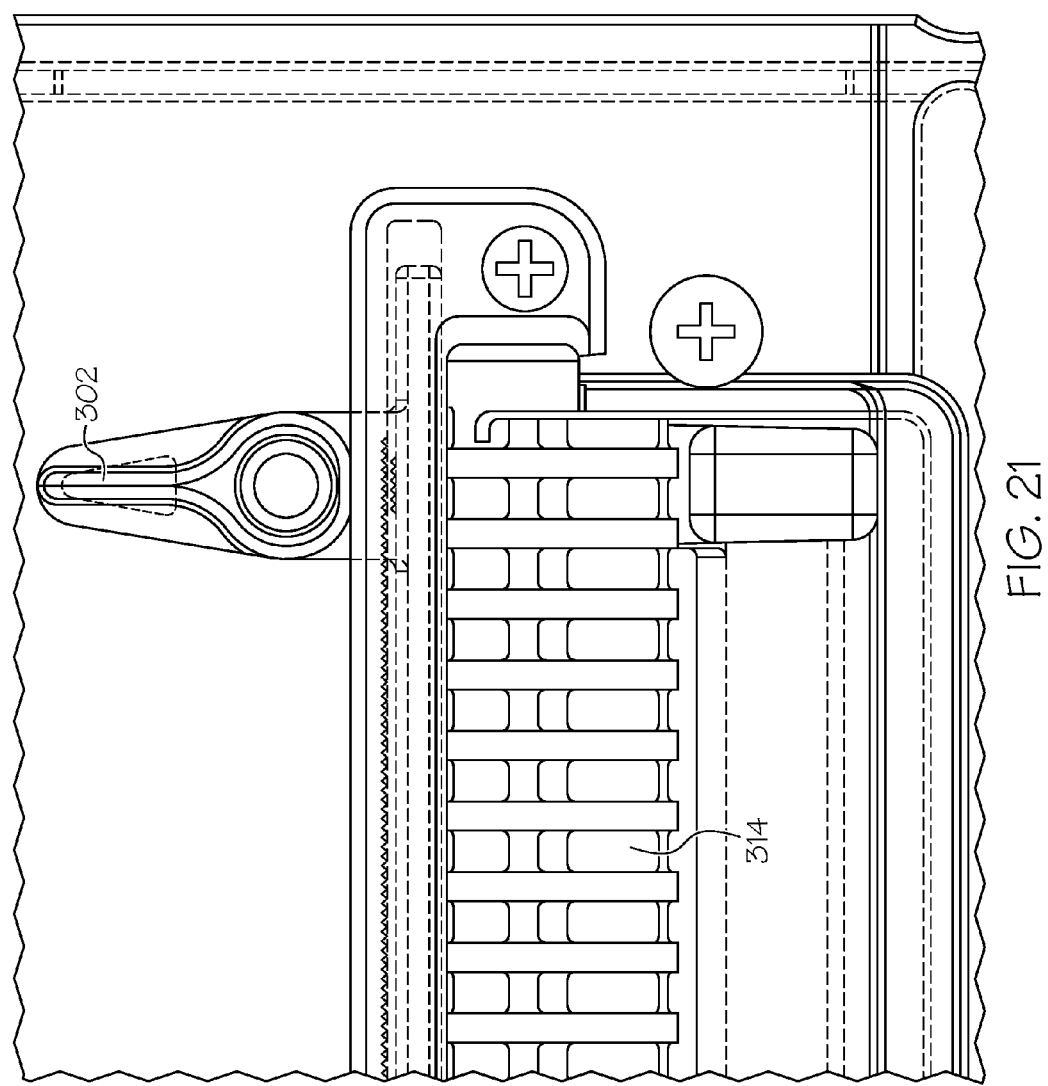
Figure 22:
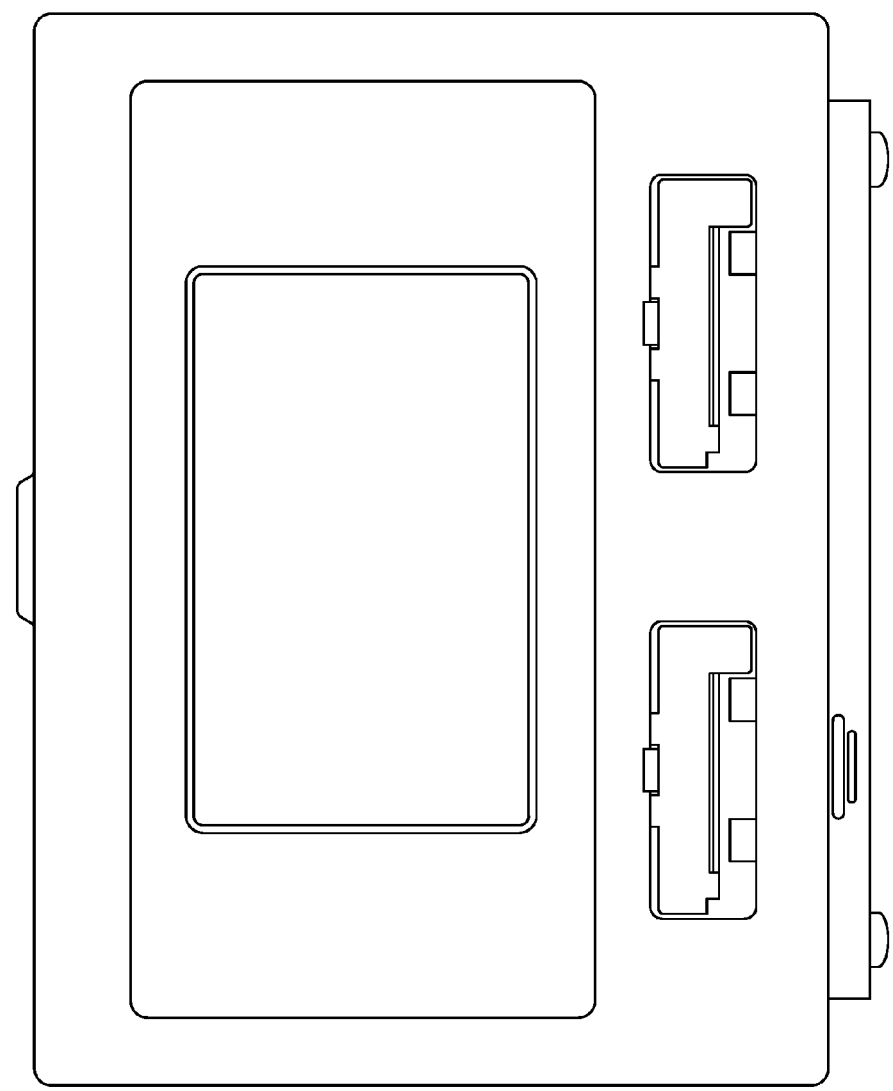
FIGS. 22-36 illustrate views of the dual port printer device and a user loading the printer device with supply rolls in accordance with the disclosed architecture.
Figure 23:
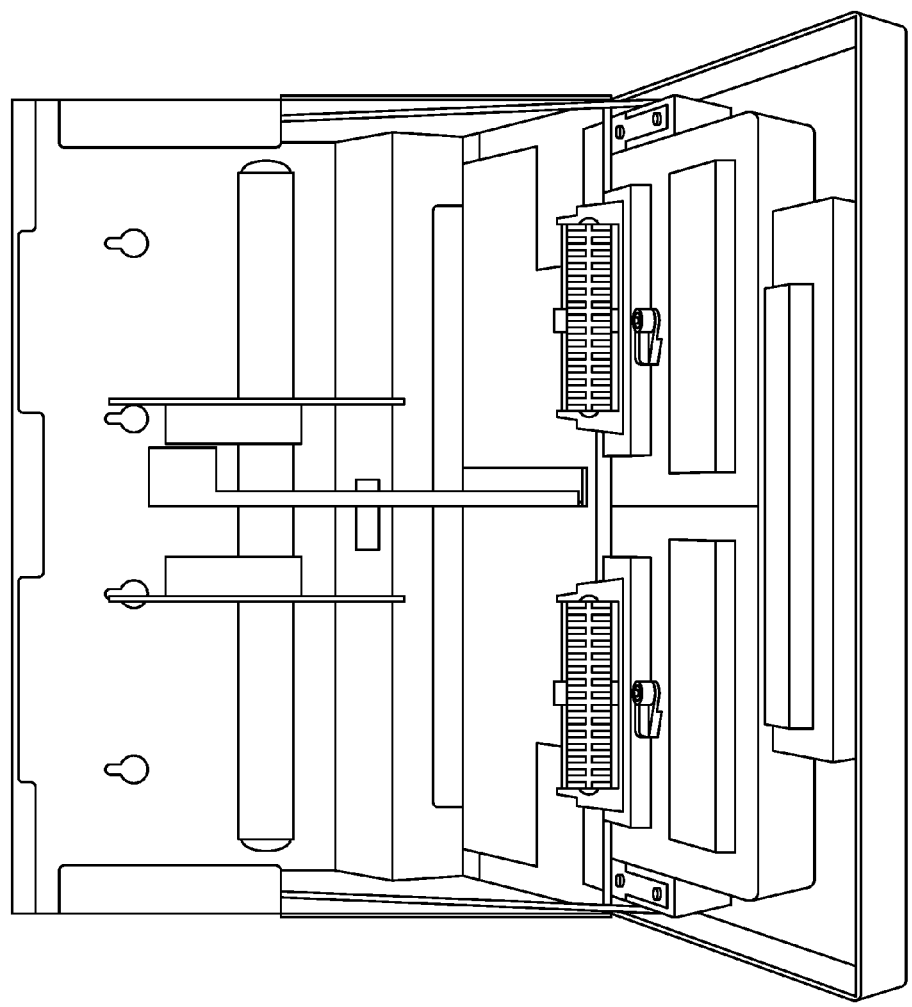
Figure 24:
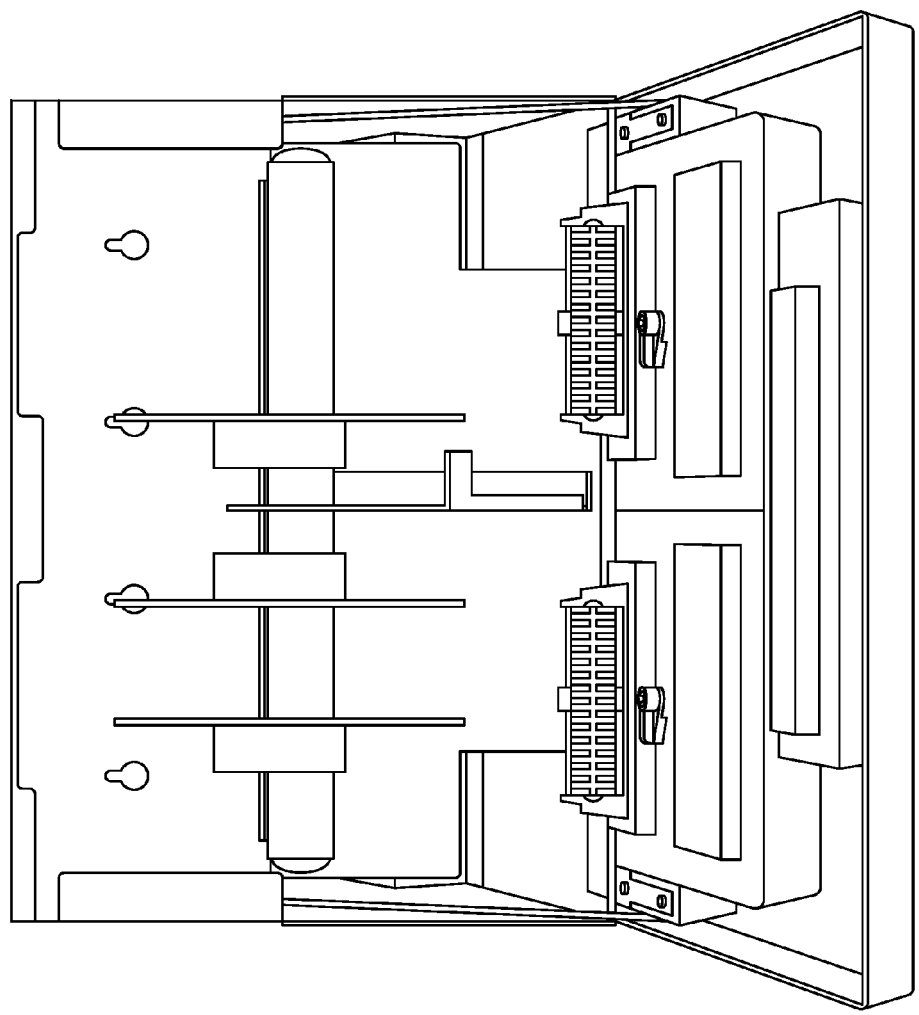
Figure 25:
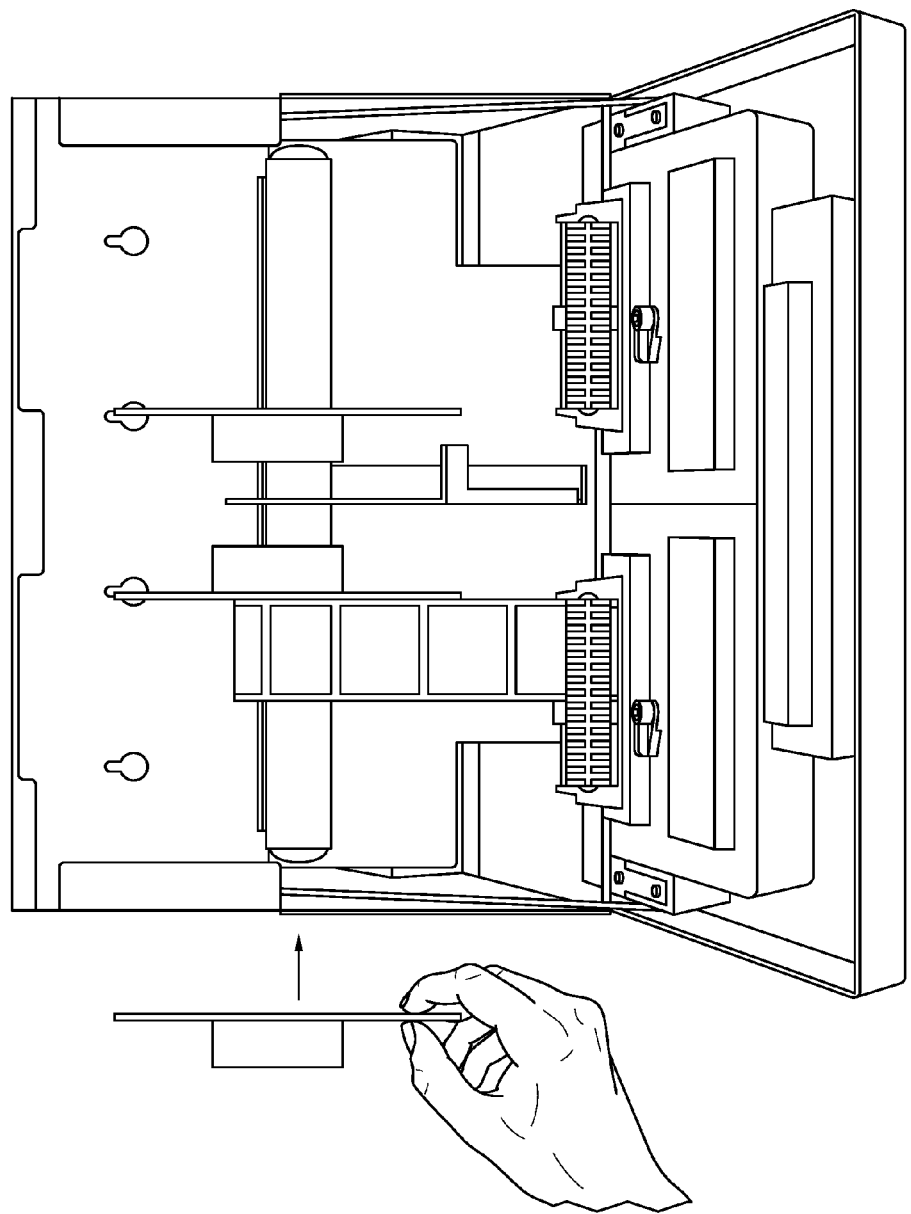
Figure 26:
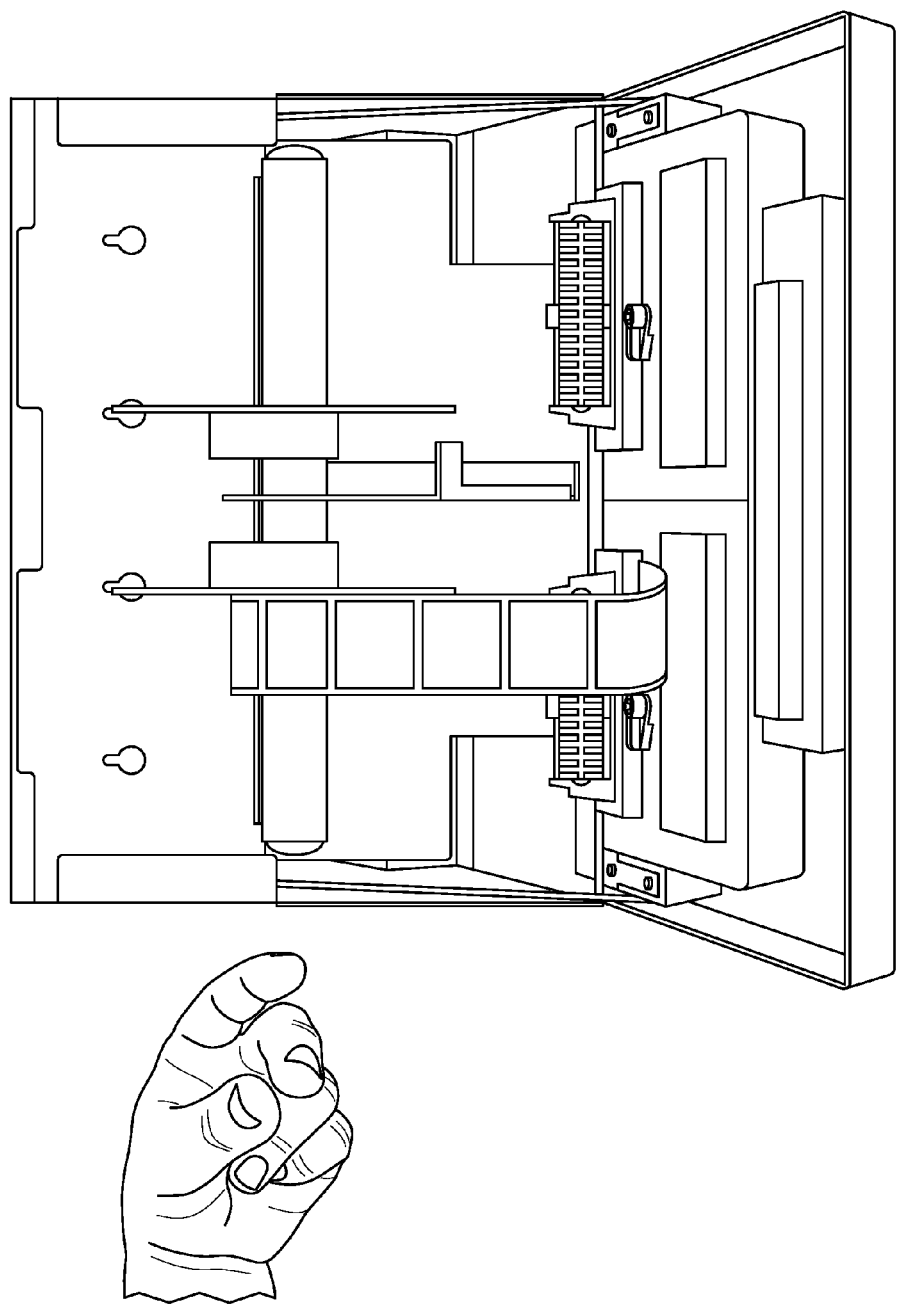
Figure 27:
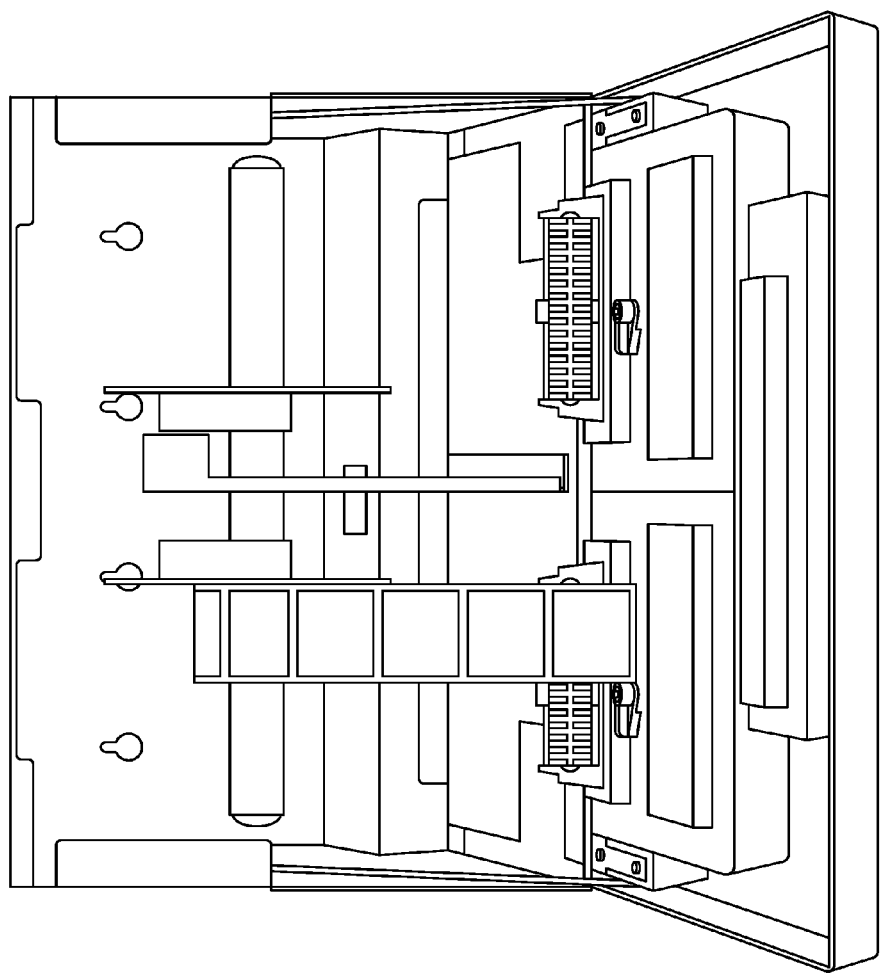
Figure 28:
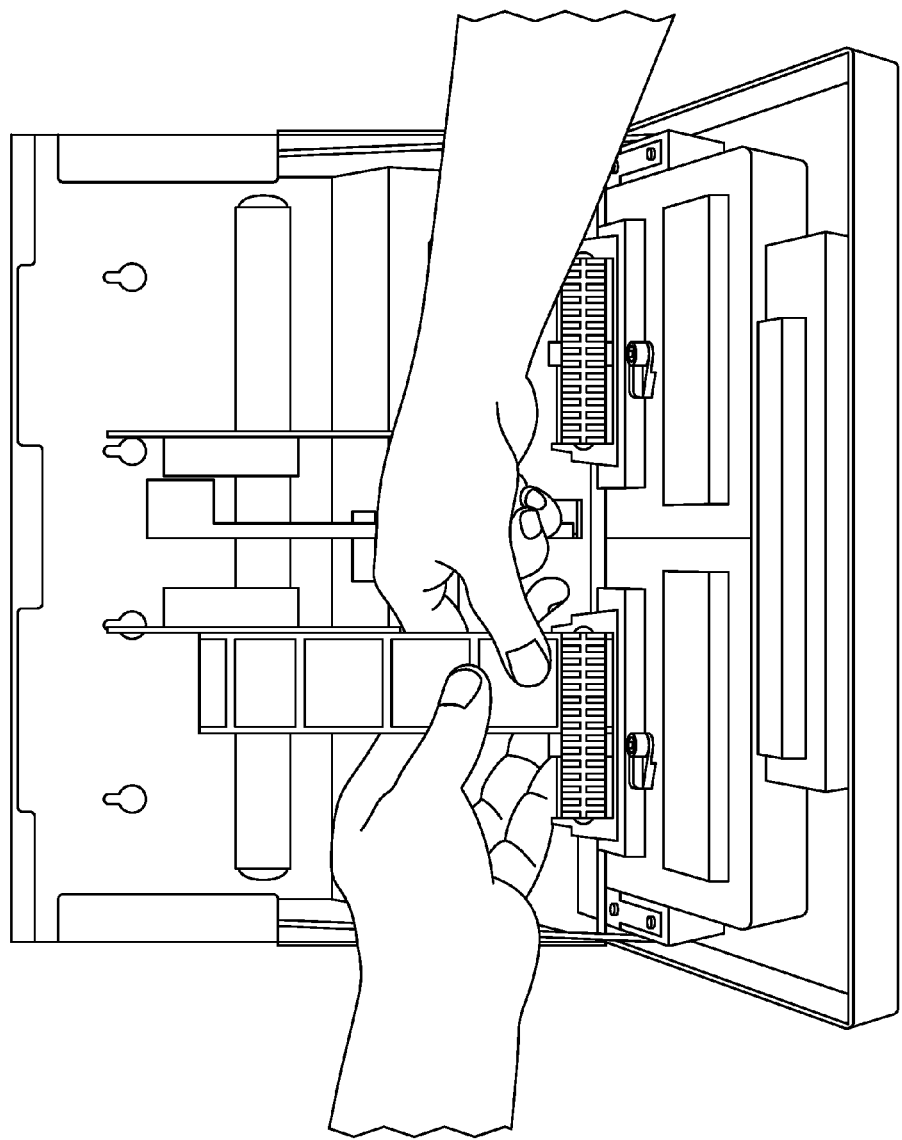
Figure 29:
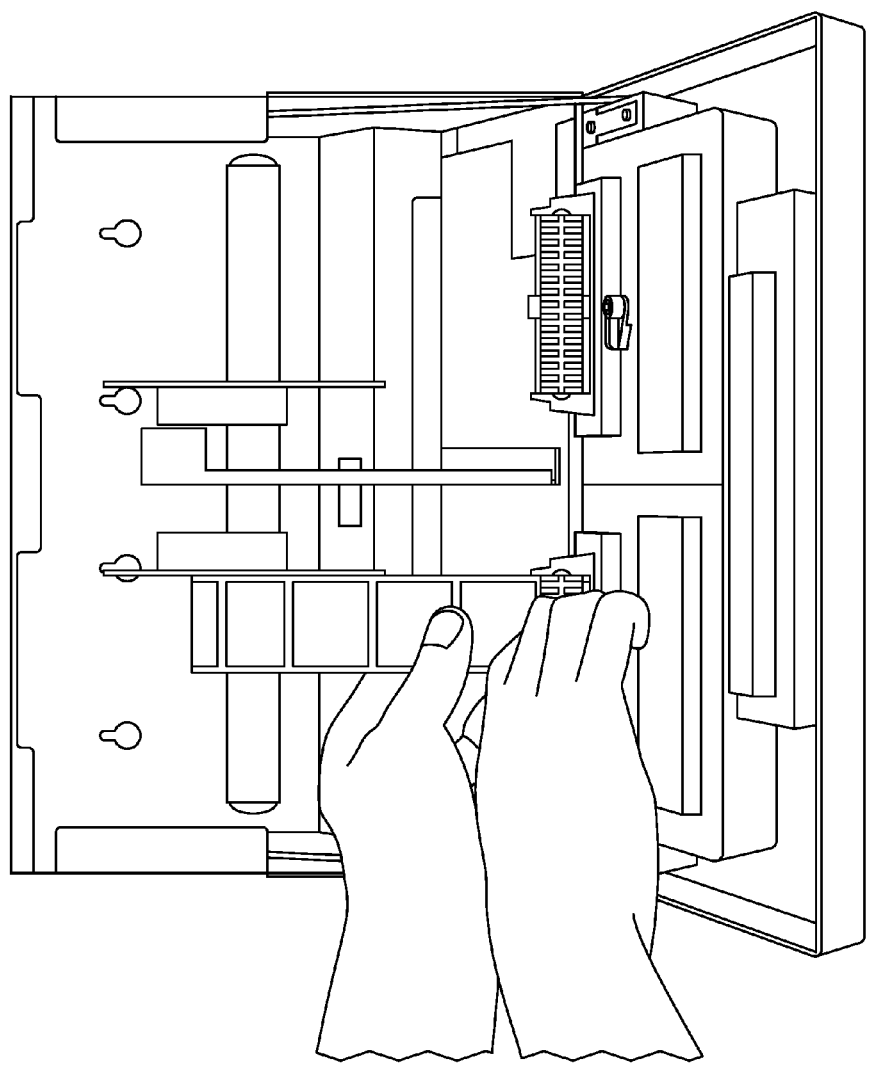
Figure 30:
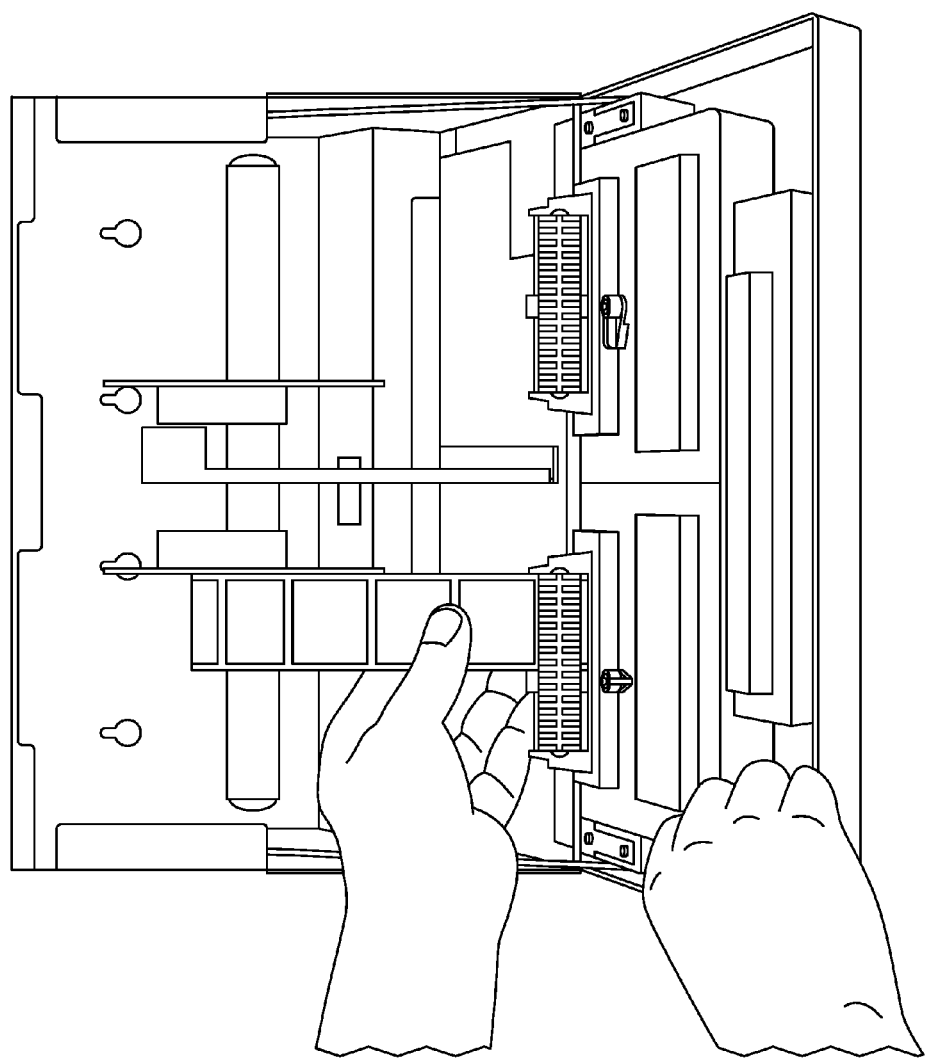
Figure 31:
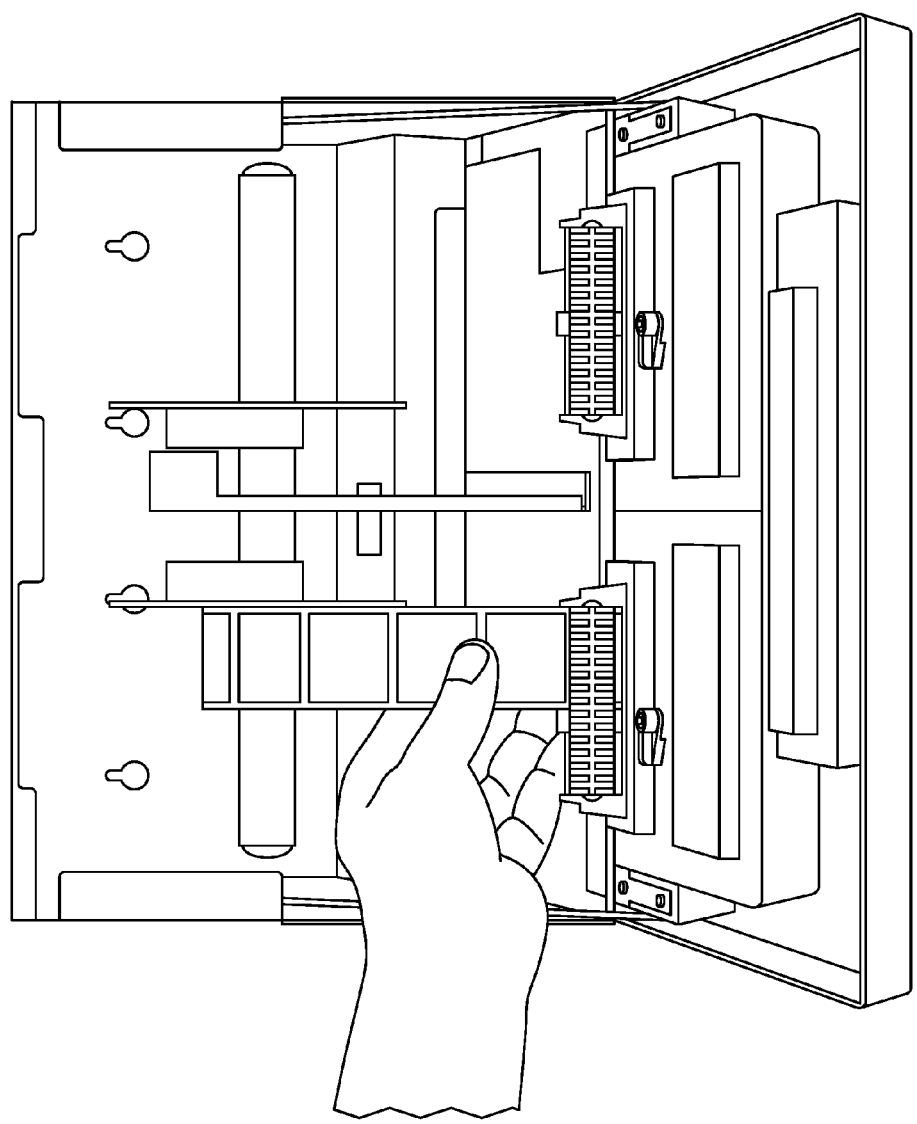
Figure 32:
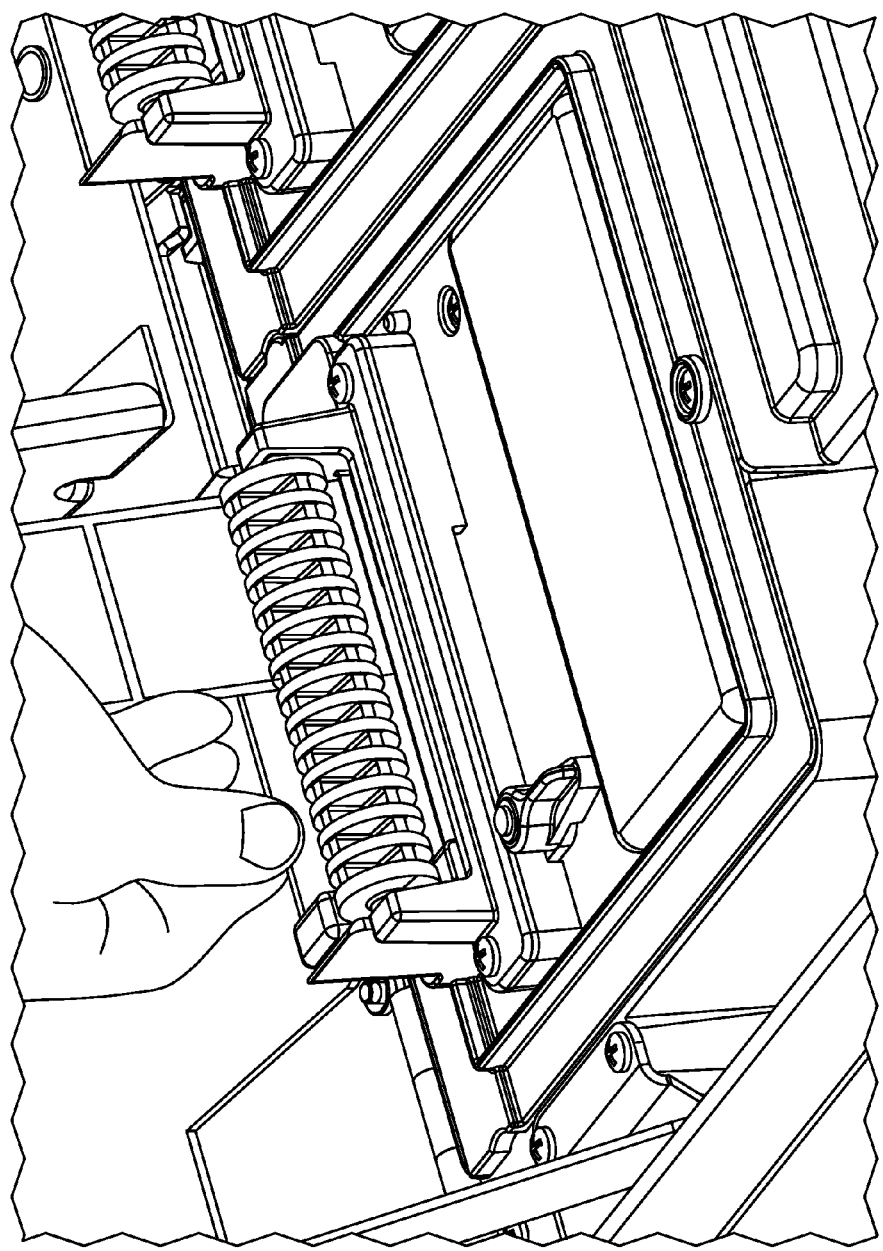
Figure 33:
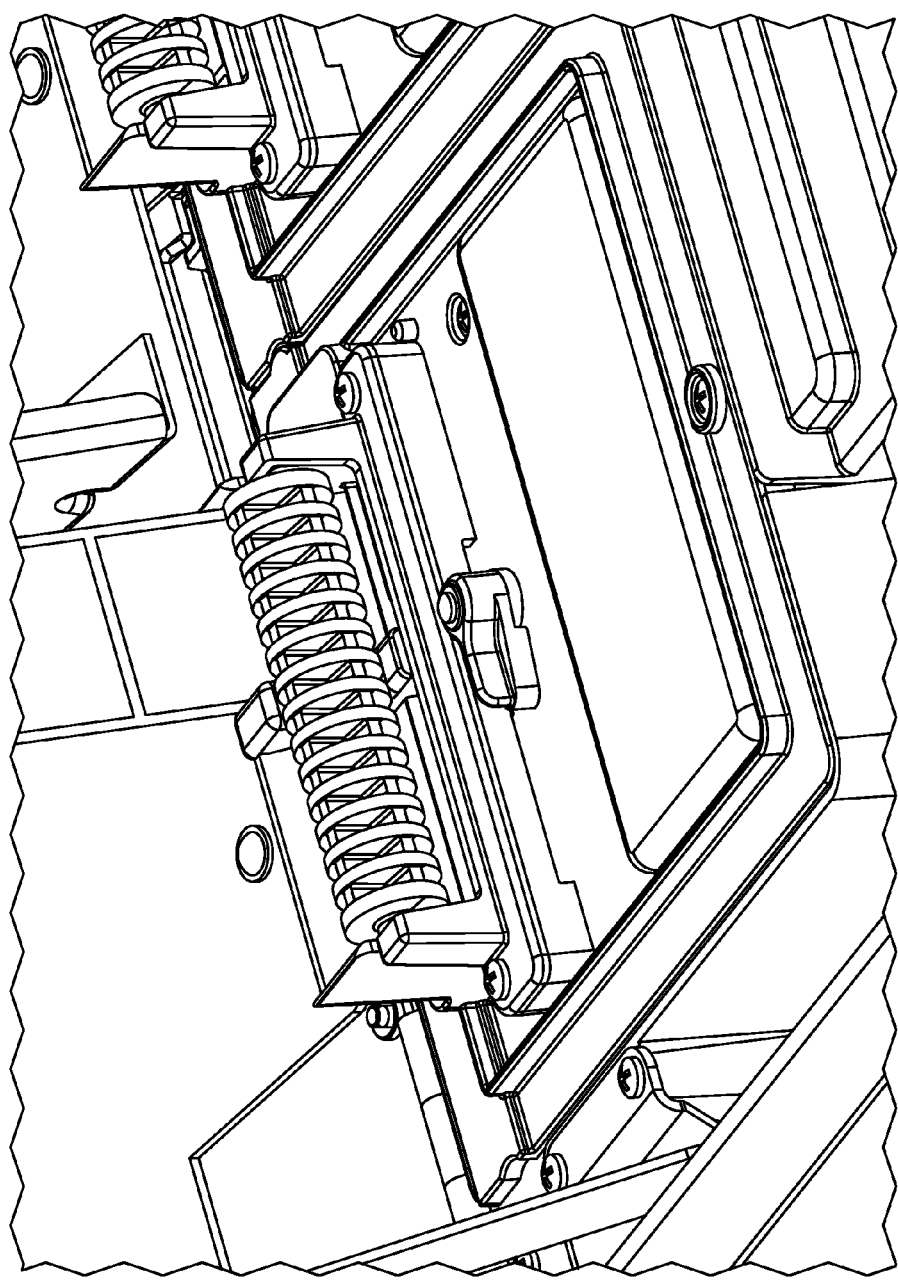
Figure 34:
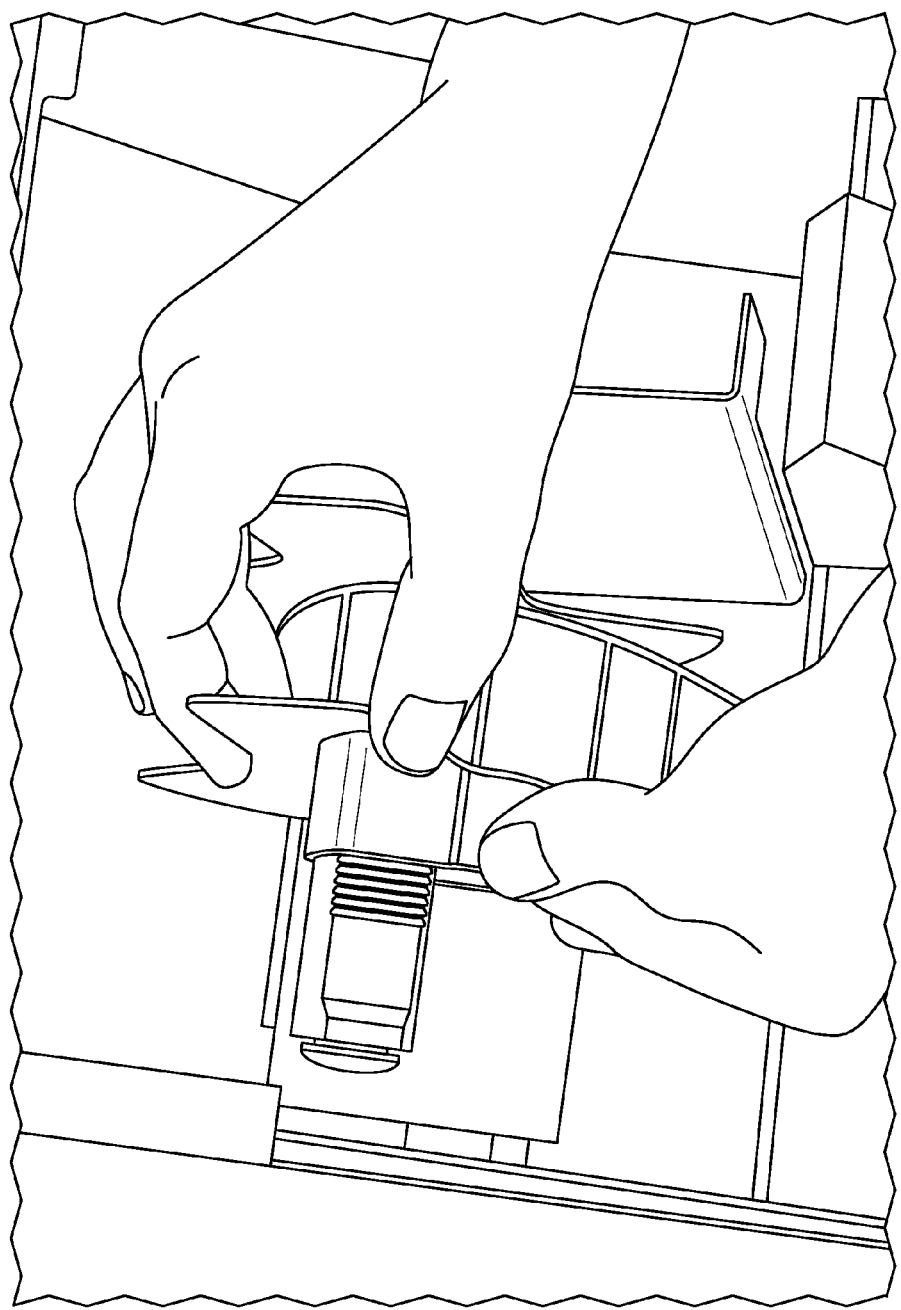
Figure 35:
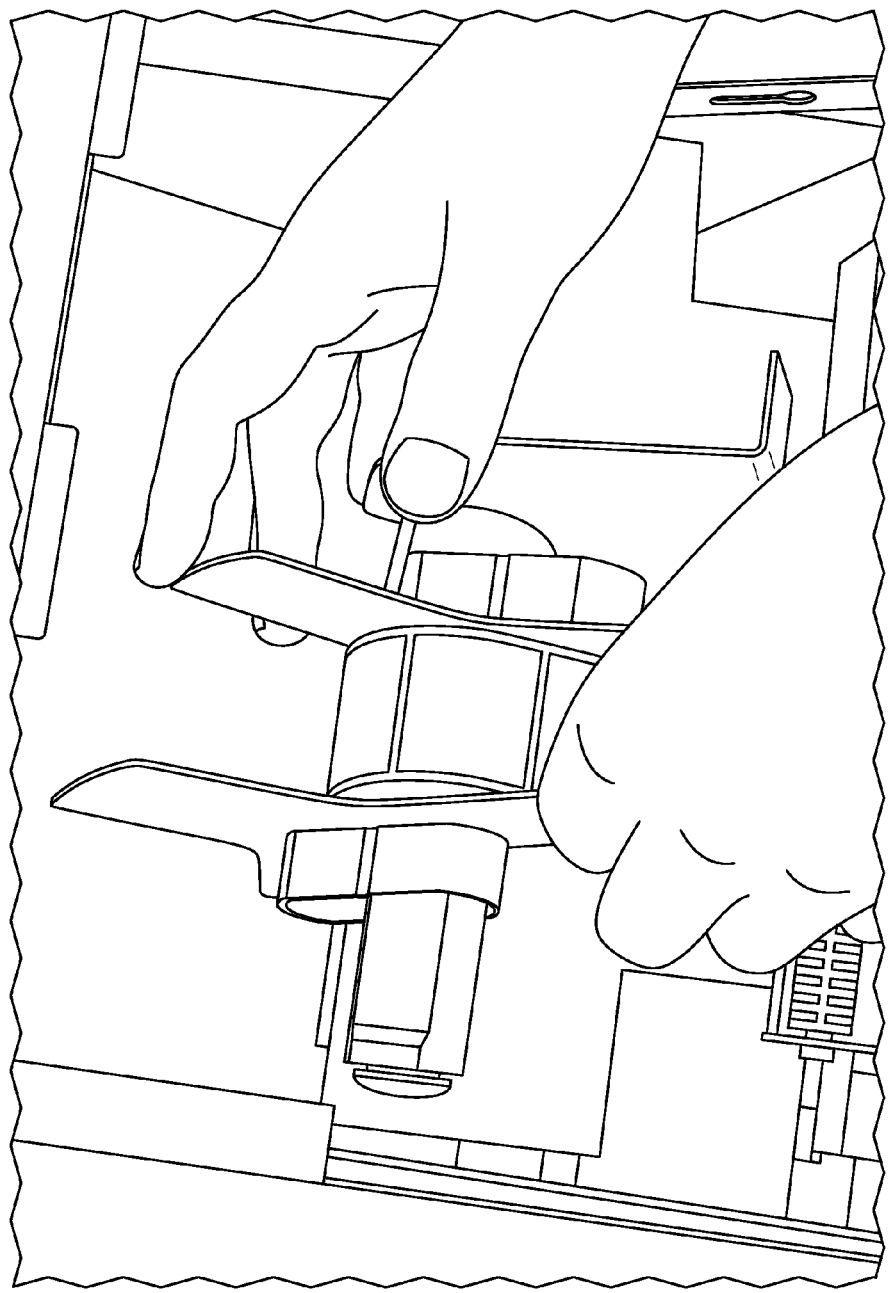
Figure 36:
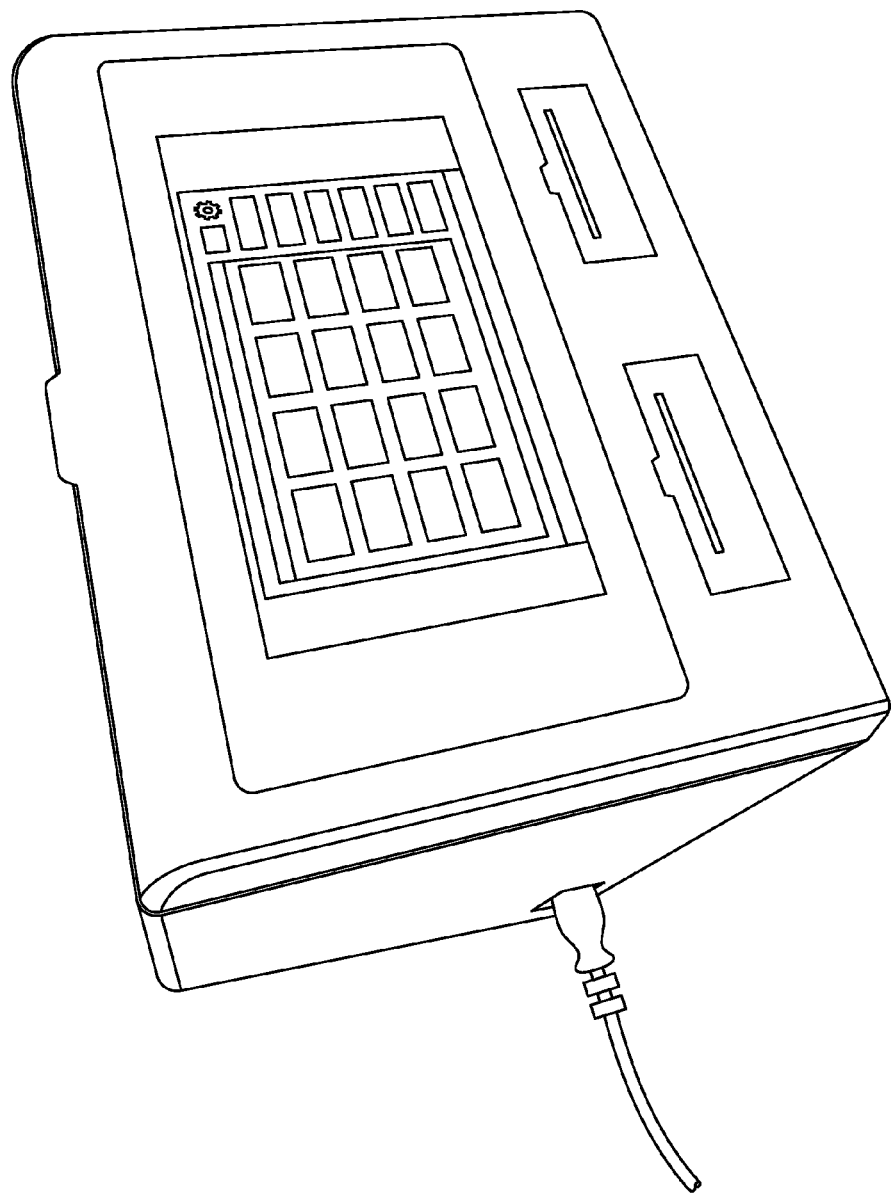
Figure 37:
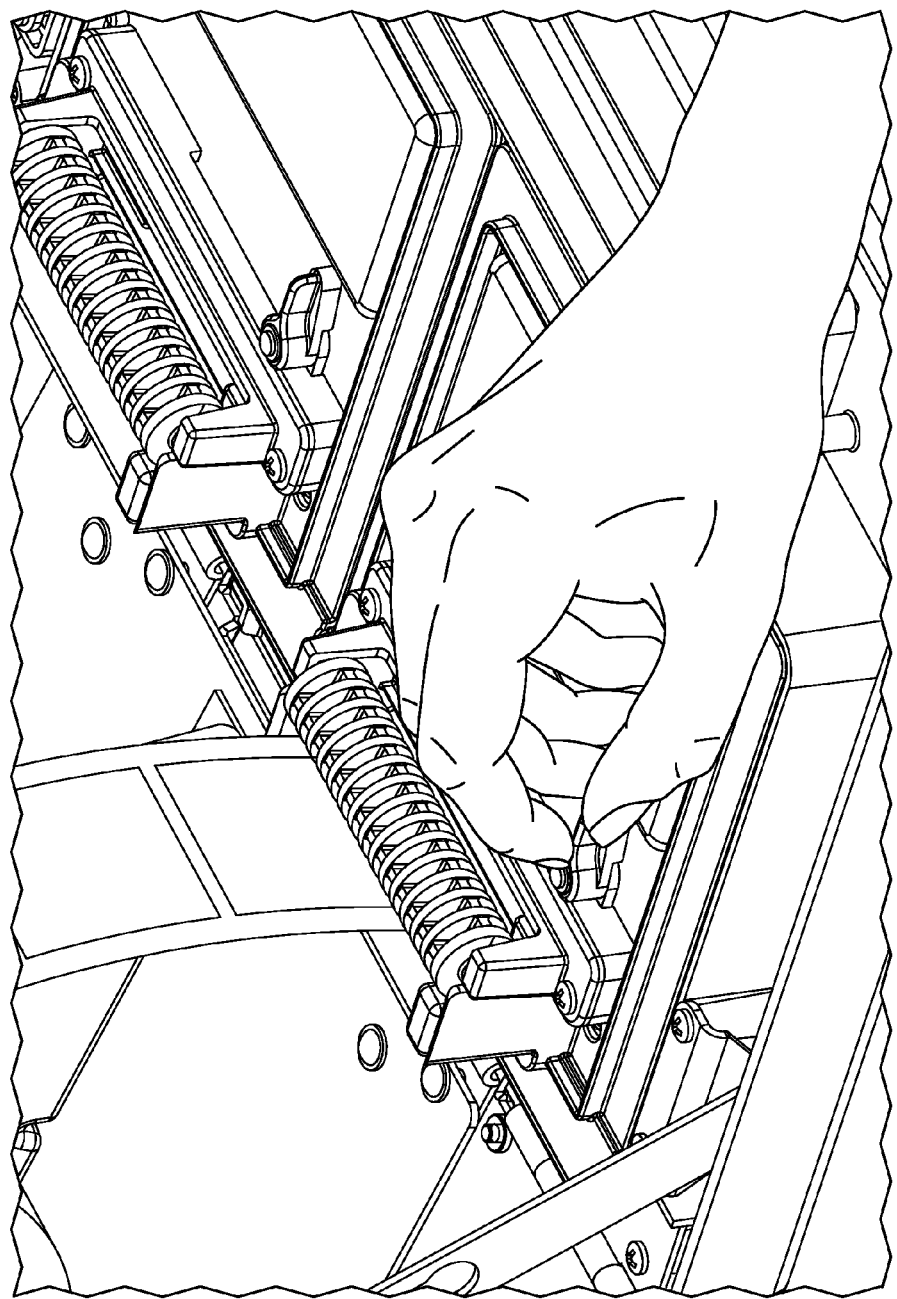
Figure 38:
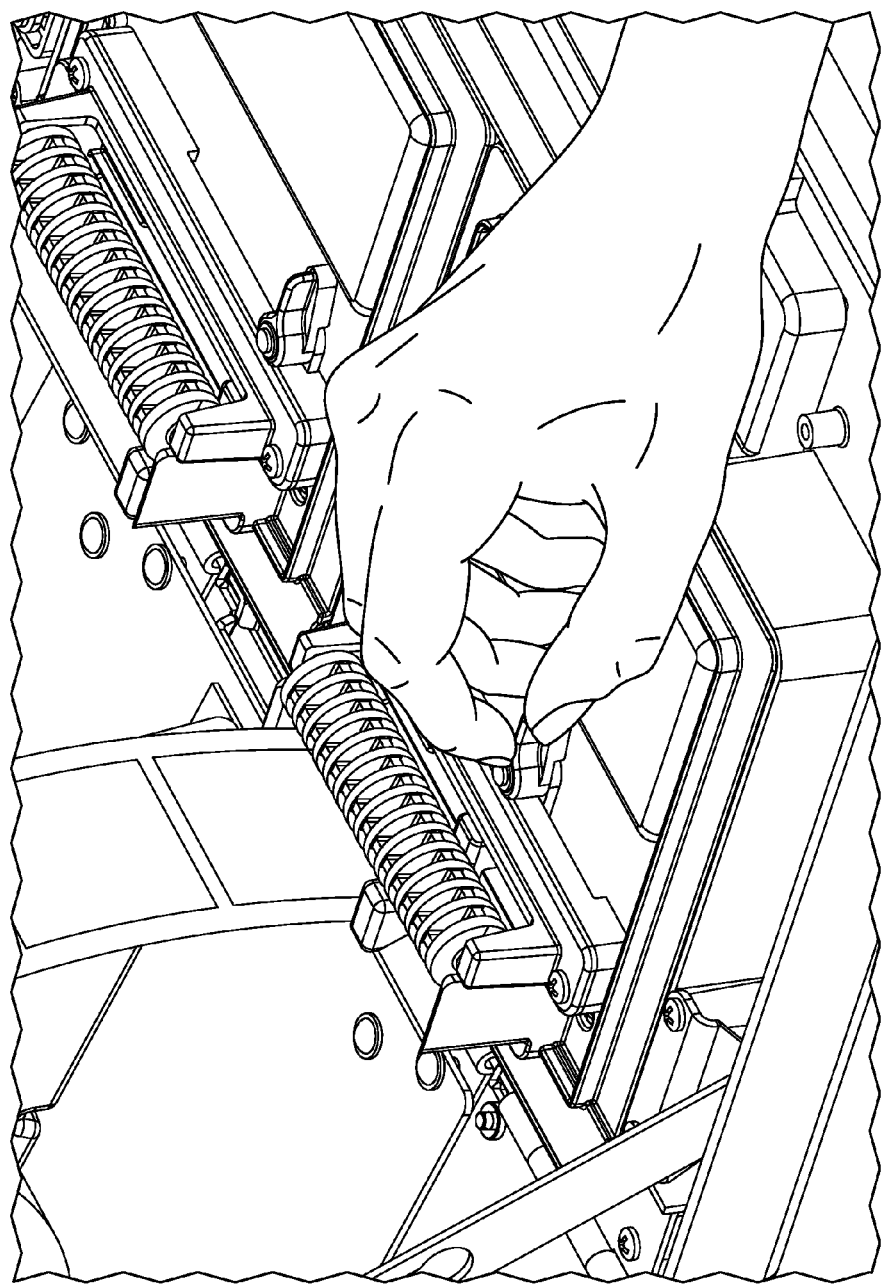
Figure 39:
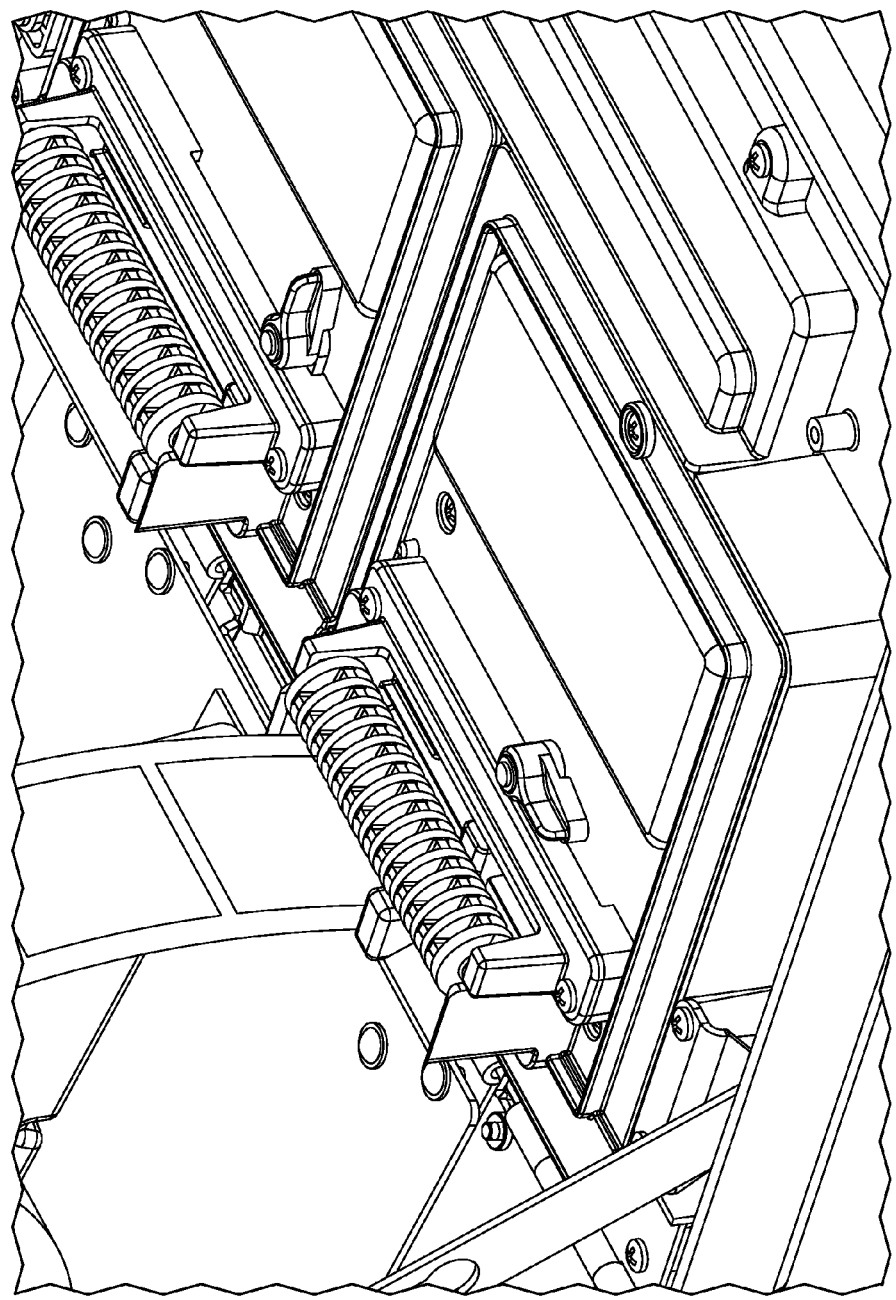
Figure 40:
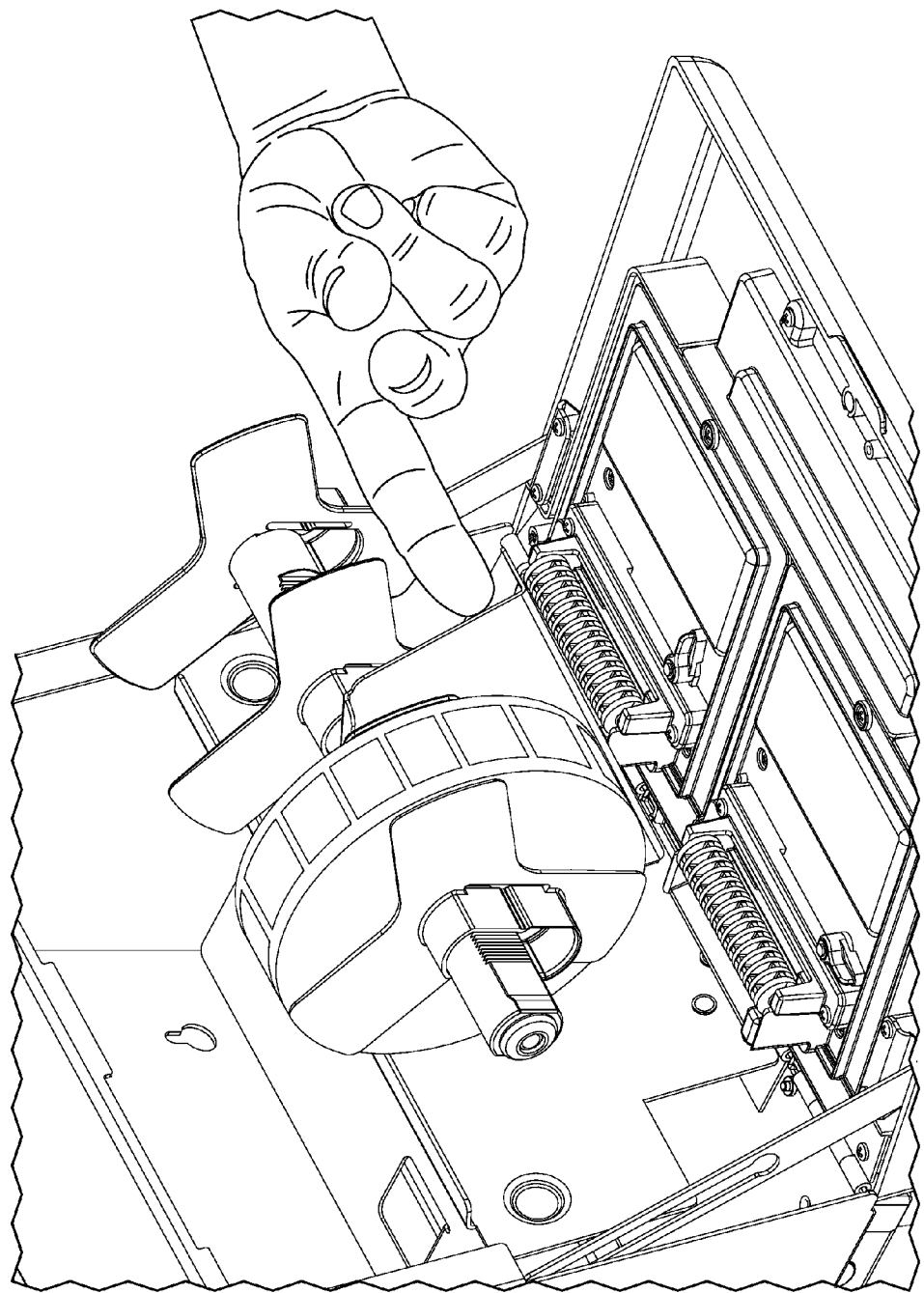
Figure 41:
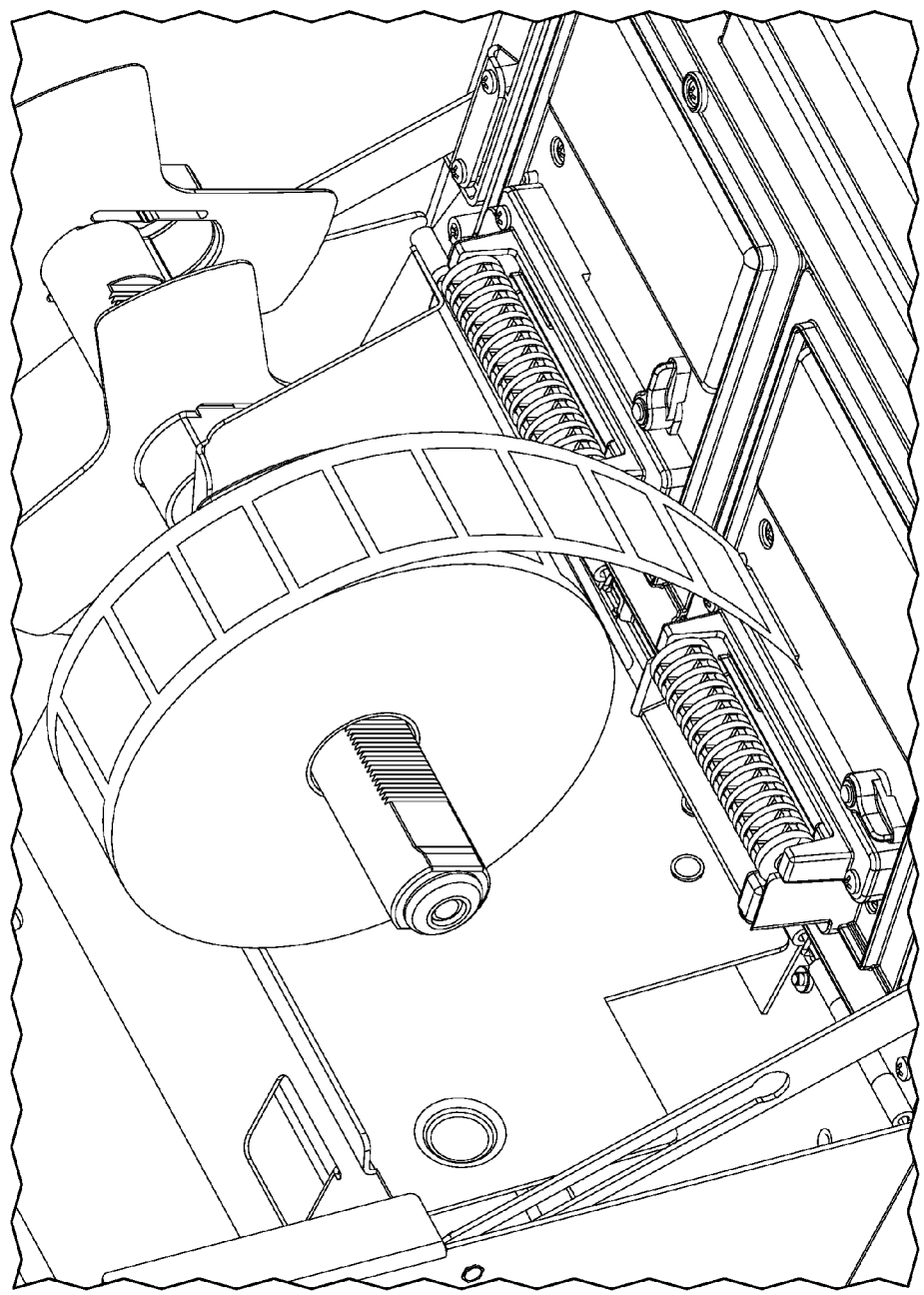
Figure 42:
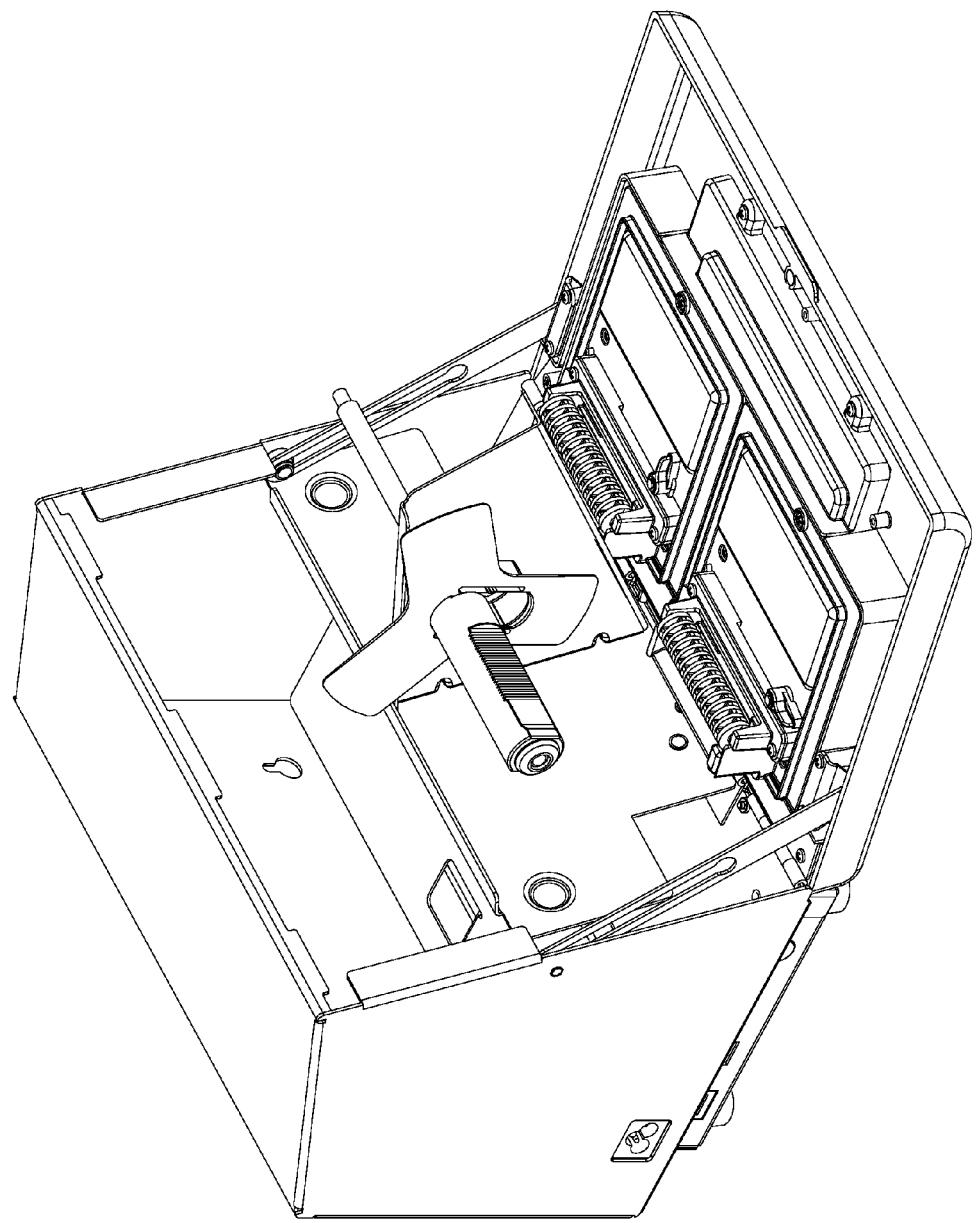
Figure 43:
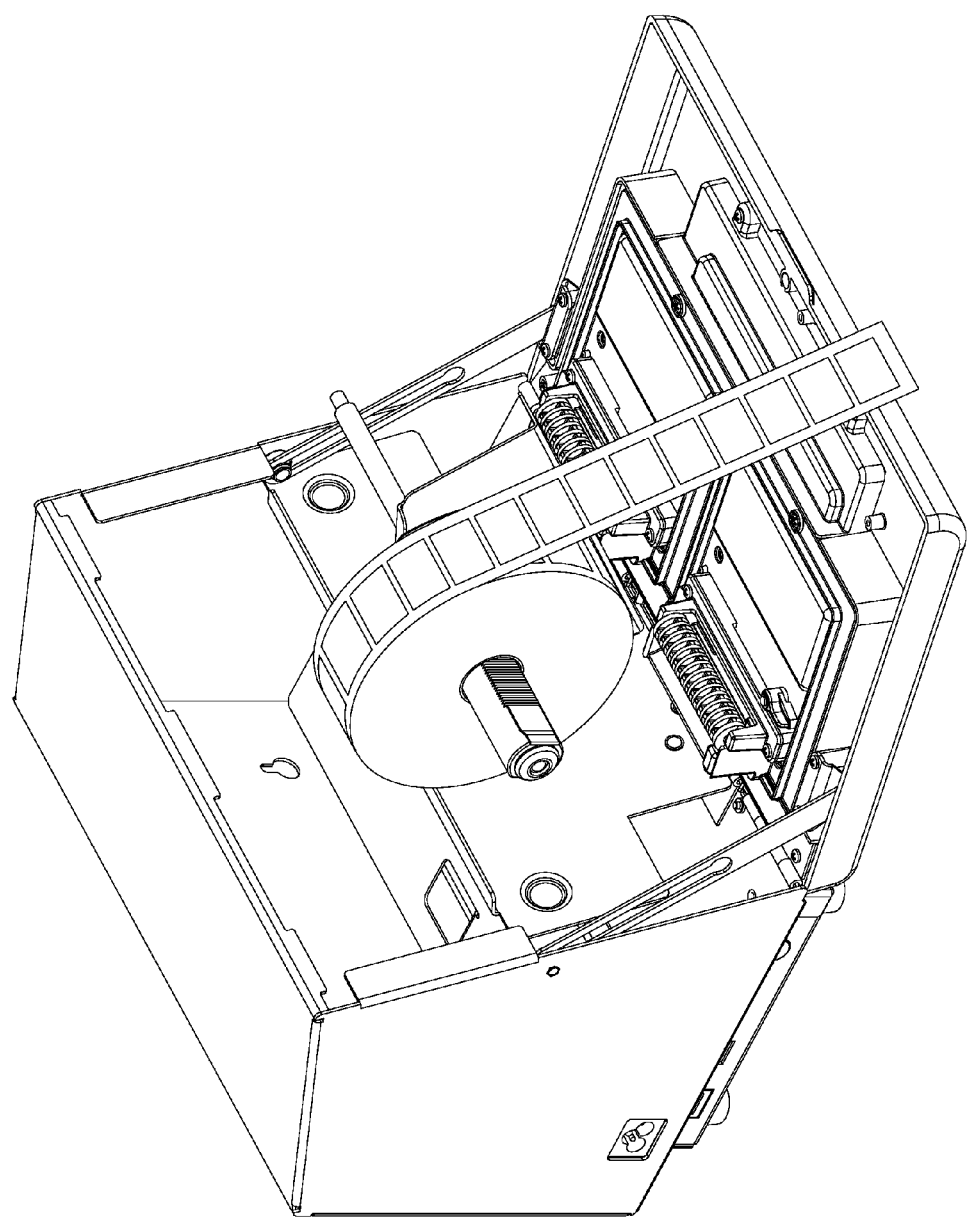
Figure 44:
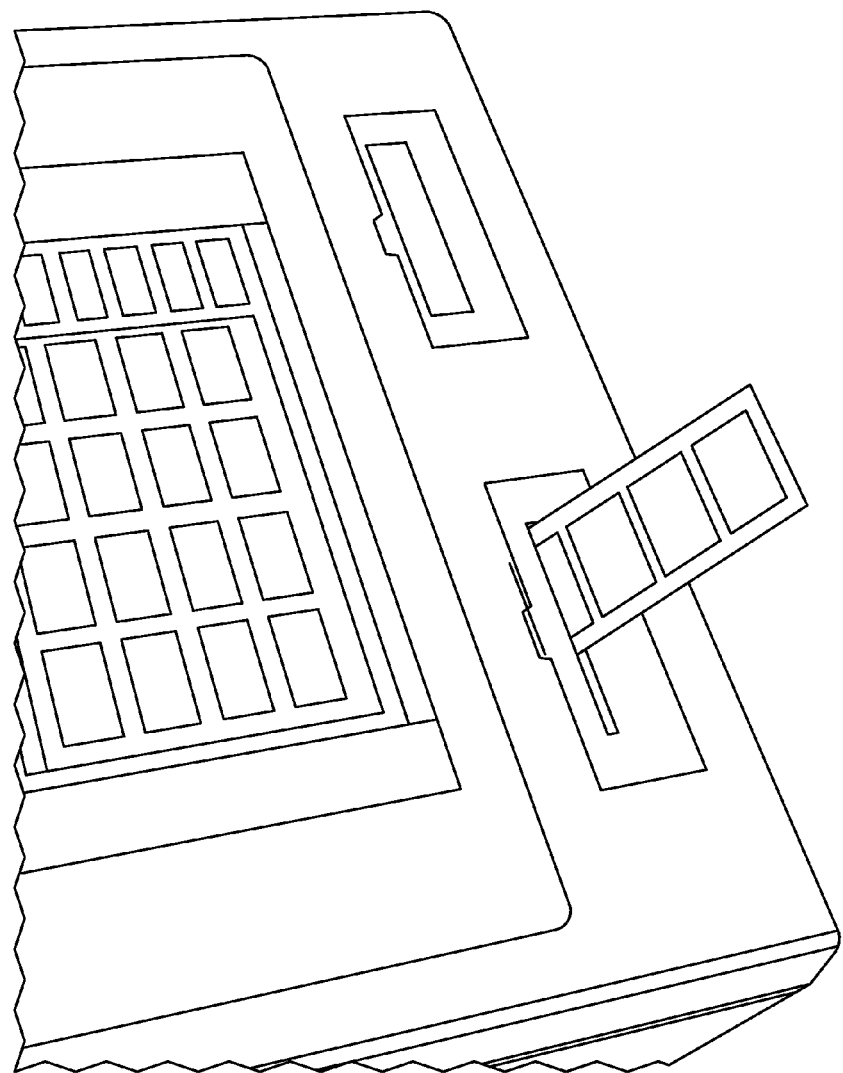
Figure 45:
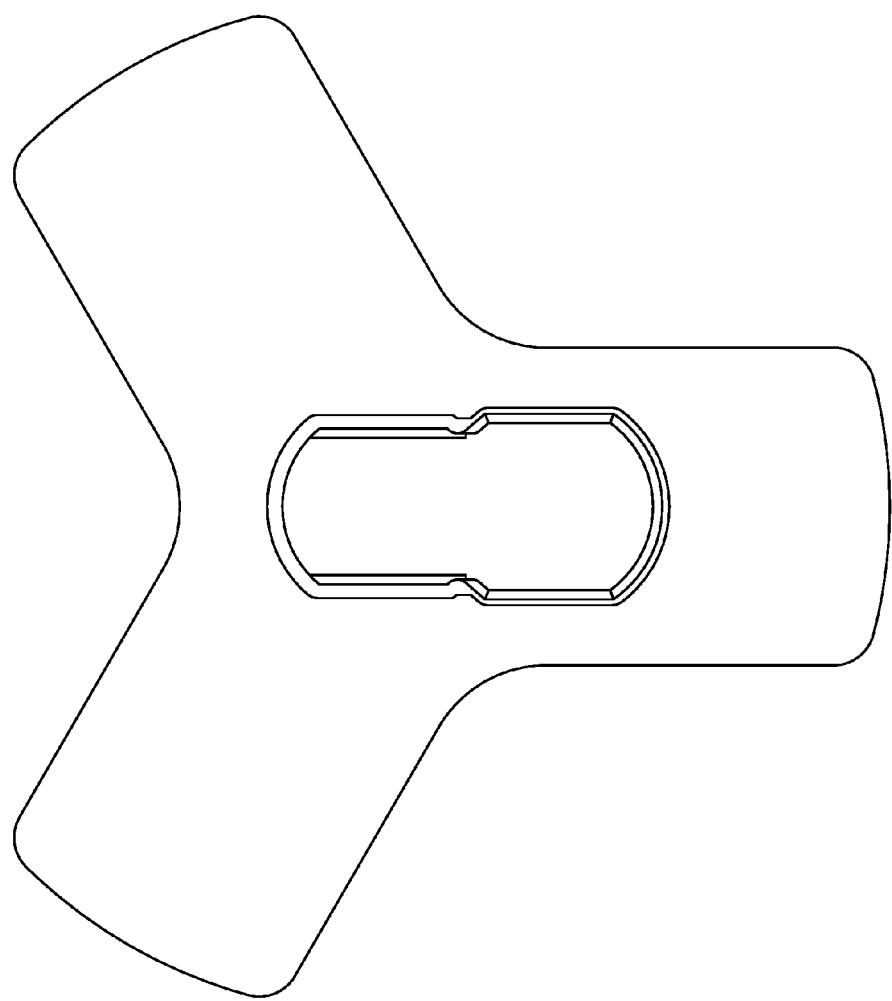
Figure 46:
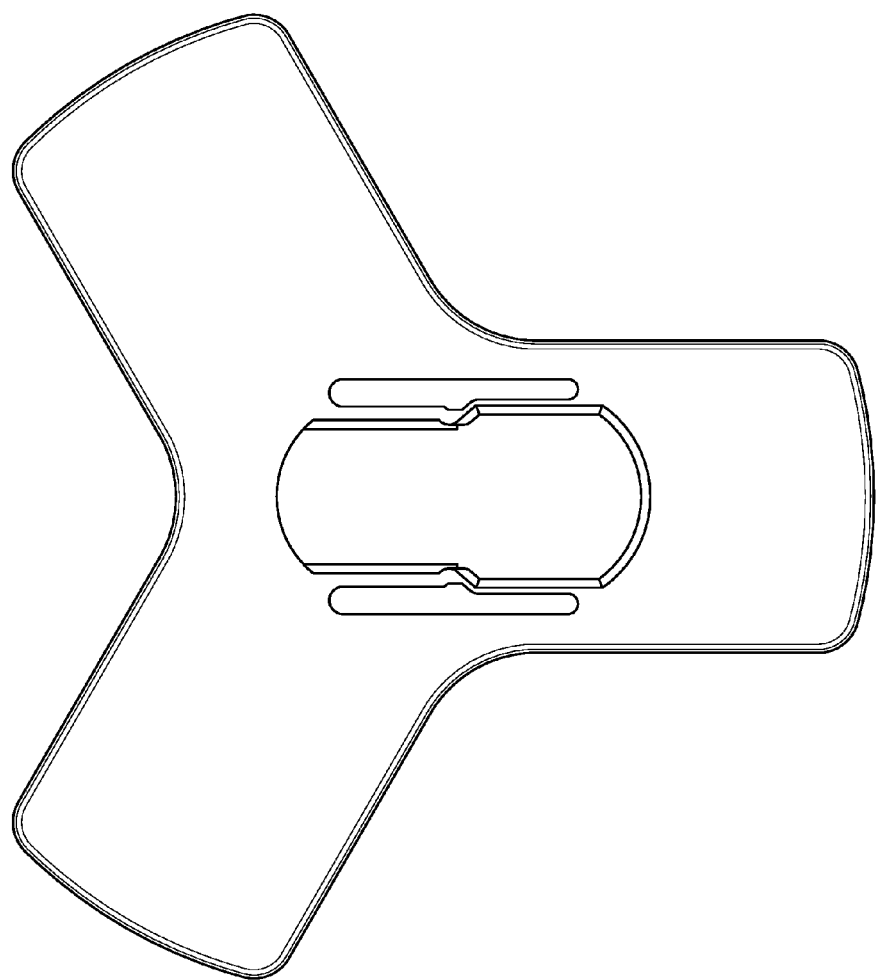
Figure 47E:
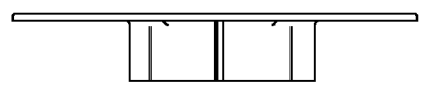
FIG. 47A-47E illustrate different view of the supply flange illustrate different views of the supply flange in accordance with the disclosed architecture.
Figure 47B:
Figure 47A:
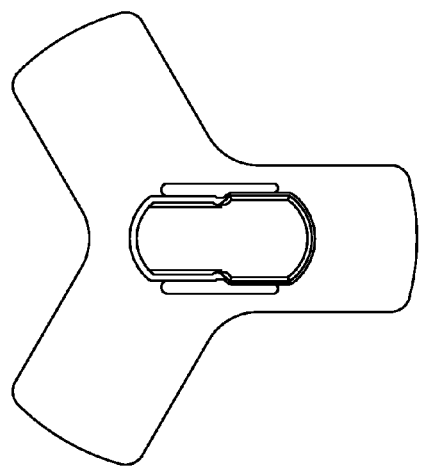
Figure 47C:
Figure 47D:
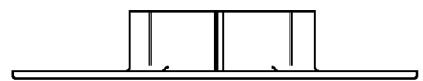
Figure 48B:
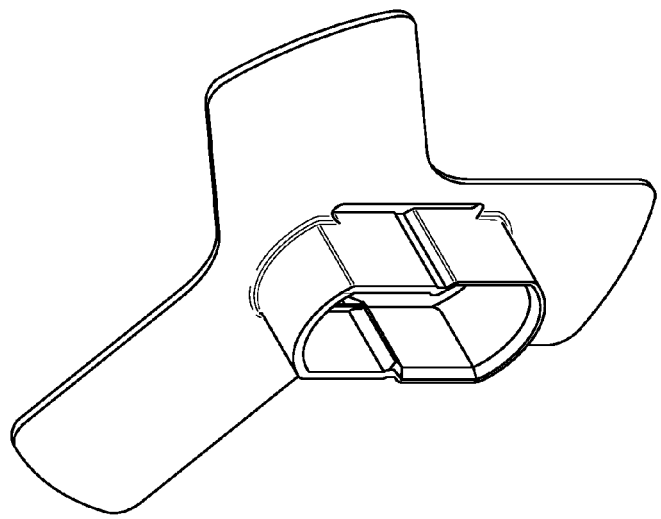
FIGS. 48A and 48B illustrate different views of the supply flange in accordance with the disclosed architecture.
Figure 48A:
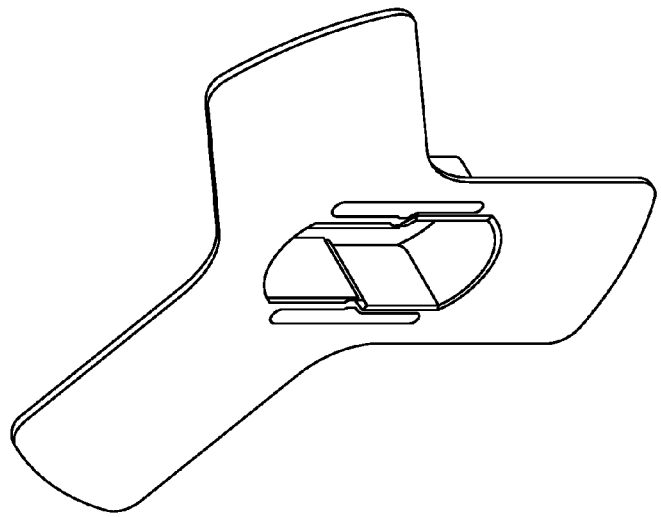
Figure 49E:
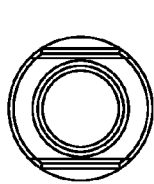
FIG. 49A-E illustrate the sawtooth configuration of the center hub in accordance with the disclosed architecture.
Figure 49B:
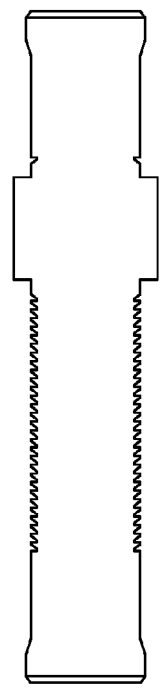
Figure 49A:
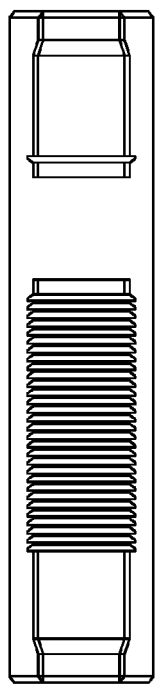
Figure 49C:
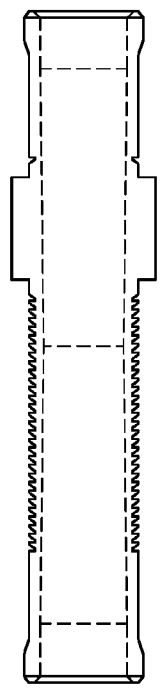
Figure 49D:
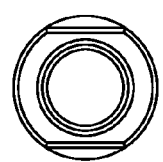
Figure 51:
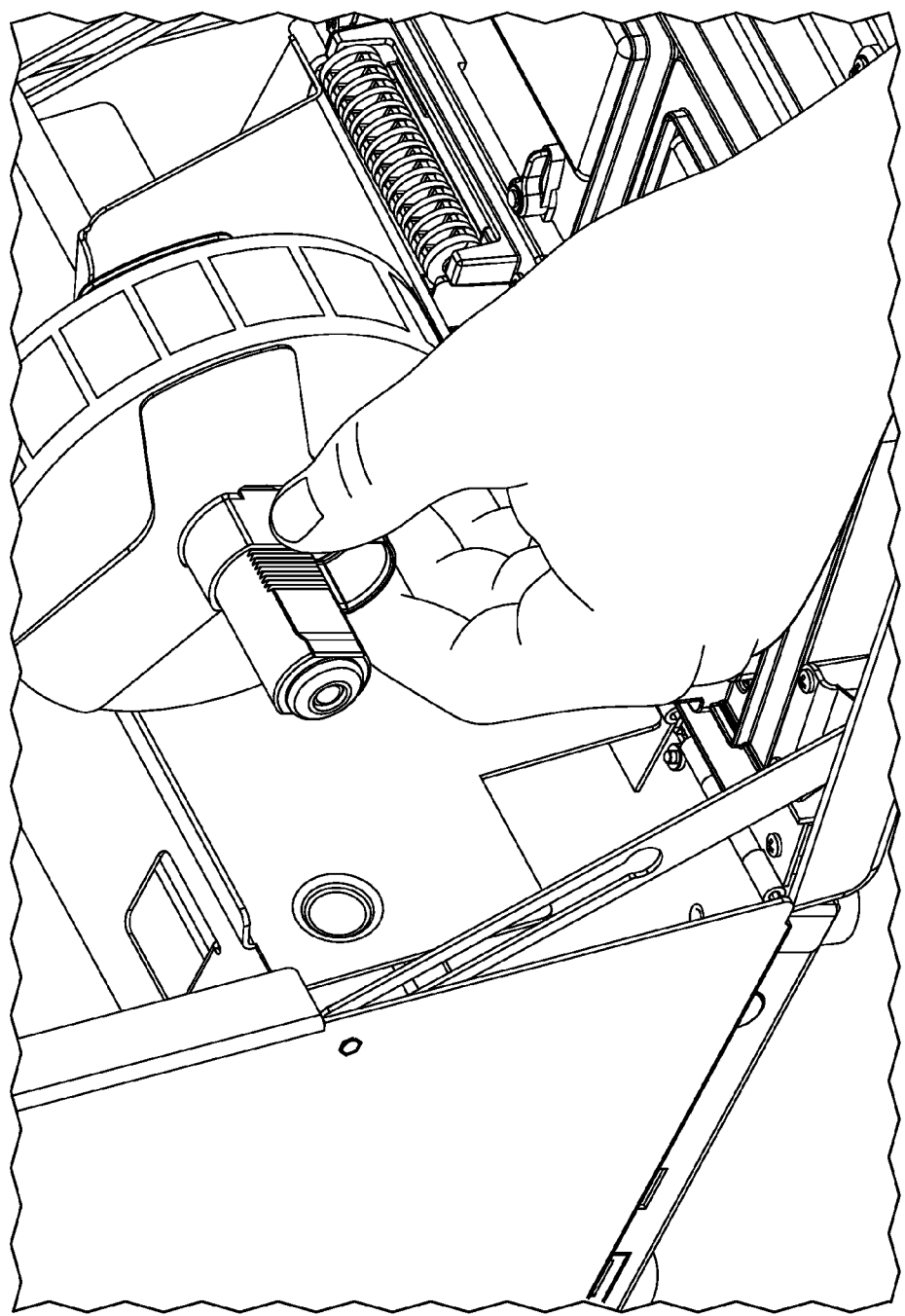
FIG. 51 illustrates additional views of the center hub in accordance with the disclosed architecture.

After the support assembly 202 is pivoted open, the outer supply flange 200 is then removed from the center hub 208 allowing a user to slide a supply roll 400 onto the center hub 208. The center hub 208 rotates on a fixed spindle 210, and typically comprises a bearing surface 212 on each end to provide for more efficient rotation and less friction during rotation (as shown in FIGS. 12-13). Further, on one end of the center hub 208 is a fixed hub retainer 222 to retain the center hub 208 on the fixed spindle 210. The center hub 208 also typically comprises a wider end section 214 and a narrower section 216. The wider end section 214 comprises the bearing surface 212 and the narrower section 216 retains the supplyflange 200 (the supply roll 400 is supported by the cylindrical section common to the entire length of center hub 208).

The center hub 208 further comprises a hidden surface 218a and single groove 218 that provides a hard stop for the inner supply flange 201. The single groove 218 would typically be positioned on opposing front and back sides of the center hub 208. The inner supply flange 201 would be abutted against the single groove 218 in a fixed position to create an edge justified side for the supply roll 400. Furthermore, the center hub 208 comprises a saw tooth configuration that provides positive locking of the outer supply flange 200 in an axial direction to retain the supply roll 400 in a desired position along the center hub 208. The multiple grooves 220 of the saw tooth configuration allow for variable supply roll widths. Accordingly, both supply flanges 200 and 201 can be removable and function in the same manner, the difference being that the outer supply flange 200 works in a plurality of grooves 220, and the inner supply flange 201 works in a single groove 218 against a fixed shoulder 218a. This allows the same set of parts to be used, no matter if the justification edge is to the inside or to the outside of the center hub 208.

The outer supply flange 200 is then slid onto the center hub 208 and secured to retain the supply roll 400 in position. The outer supply flange 200 (as shown in FIGS. 50A and 50B) comprises a wide opening 224 and a narrow opening 226. The wide opening 224 allows the supply flange 200 to easily slide over the wide end section 214 of the rotating center hub 208. The walls 228 of the wide opening 224 are typically thin to allow for flexure which is required for detent. Specifically, a narrow bump 230 is then provided on opposing sides of the supply flange 200 between the wide opening 224 and the narrow opening 226. The narrow bump 230 provides a detent feature that allows the supply flange 200 to snap onto the center hub 208 and be secure.

The supply flange 200 is slid onto the center hub 208 until it contacts the supply roll 400. A vertical elongated tooth 232 positioned on opposing sides of the supply flange 200 in the narrow opening 226 is then aligned with one of the multiple grooves 220 of the saw tooth configuration of the center hub 208. A user then pushes the supply flange 200 down in a vertical direction, such that the elongated teeth 232 engage with one set of opposed grooves of the multiple grooves 220 of the center hub 208, causing the center hub 208 to be positioned in the narrow opening 226 of the supply flange 200. The detent narrow bumps 230 then act to lock the supply flange 200 onto the center hub 208, however the detent narrow bumps 230 are also easy to be released during removal of the supply flange 200 by pushing supply flange 200 up, in the opposite direction than installation.

Once the supply roll 400 is loaded onto the center hub 208 and secured with a supply flange 200, the support assembly 202 is then pivoted back into the printer housing cavity away from the user. Easy access is now provided to load the supply web from the supply roll 400 into the loading chute 300. Please note that if the dual port printer 100 is turned on, a sensor would detect the presence of the supply web and would auto-feed the supply web into the loading chute 300. However, a user may also manually load the supply web into the loading chute 300.

Further, as shown in FIGS. 17-21, the locklever 302 can be used to adjust the width of the loading chute 300. For example, the inside surface 304 of the supply guide 306 moves with the locklever 302 as an assembly, such that the locklever 302 is rotatably mounted onto the supply guide 306. Specifically, when the locklever 302 is in an unlocked position, the supply guide/locklever assembly can slide horizontally along the guide track 308 to adjust the width of the supply guide 306 and loading chute 300. The guide track 308 comprises a pocket 312 that receives the sliding feature of the supply guide 306 and allows the supply guide 306 to slide horizontally along the guide track 308 for variable width supplies. Thus, the inside surface 304 of the supply guide 306 moves with the locklever 302 which acts as a handle, to adjust the width of the loading chute 300.

Once the desired width is reached, the locklever 302 is rotated approximately 90 degrees clockwise or counter-clockwise to a locked position. Based on the cam action of the locklever 302, when the locklever 302 is rotated approximately 90 degrees clockwise or counter-clockwise, teeth 310 of the guide 306 engage the teeth 310a of guide track 308 holding it in place. Thus, when the teeth 310 are disengaged, the locklever 302 is in an unlocked position and the supply guide/locklever assembly freely slides along the guide track 308 for width adjustment. And, when the locklever 302 is rotated approximately 90 degrees clockwise or counter-clockwise to a locked position, the teeth are drawn into engagement, and interference/friction holds the locklever 302 in a locked position, and the supply guide 306 is then held in place.

Once the width is adjusted and the locklever 302 secured and in a locked position, the load chute opening would direct the supply web into the printing module (not shown). The transfer roller 314 would then direct the supply web into the printing module and a user would then close the front door 106 and begin printing.

Now that the structure and configuration of the dual port printer device 100 has been generally described, its operation will be discussed as shown in FIGS. 22-49. To operate one embodiment of the dual port printer device 100 of the present invention, a user first typically loads the desired size and width of supply rolls 400 into the dual port printer device 100. The dual port printer device 100 is configured to accommodate multiple widths of supply rolls 400.

A user opens the hinged front door 106 and pivotally rotates the inner supply support assembly 202 to access the interior of the dual port printer 100 to insert a new supply roll 400 on the center hub 208. Specifically, the user grabs the tab 204 to pivot the support assembly 202 toward the user until the support assembly 202 contacts the stop feature 206 positioned on opposing edges of the interior of the dual port printer 100. The stop feature 206 prevents the support assembly 202 from being rotated any further. Once the support assembly 202 is pivoted over its center of gravity, the support assembly 202 will remain in an open position, allowing the user to easily load supply rolls 400 onto the center hub 208.

A user then removes the outer supply flange 200 from the center hub 208 and slides a supply roll 400 onto the center hub 208. The supply roll 400 is slid onto the center hub 208 until it rests against the inner supply flange 201 which is typically in a fixed position on the center hub 208 to create an edge justified side. The outer supply flange 200 is then slid onto the center hub 208 and secured to retain the supply roll 400 in position. The wide opening 224 of the outer supply flange 200 allows the supply flange 200 to easily slide over the wide end section 214 of the rotating center hub 208. A user slides the wide opening 224 of the supply flange 200 onto the center hub 208 until it rests against the supply roll 400.

The vertical elongated tooth 232 positioned on opposing sides of the narrow opening 226 of the supply flange 200 will be in approximate alignment with one of the multiple grooves 220 of the saw tooth configuration of the center hub 208. A user then pushes the supply flange 200 down in a vertical direction, such that the elongated tooth 232 engages with one set of opposed grooves of the multiple grooves 220 of the center hub 208, and the center hub 208 is then positioned in the narrow opening 226 of the supply flange 200. The supply flange 200 is pushed down vertically until the detent narrow bumps 230 deflect in and then act to lock the supply flange 200 in place on the center hub 208.

Once the supply roll 400 is loaded onto the center hub 208 and secured with a supply flange 200, the user then pivots the support assembly 202 back into the printer housing cavity, by grasping the tab 204 and pushing the support assembly 202 toward the interior of the printer housing cavity. The user then loads the supply web from the roll 400 into the loading chute 300. Please note that if the dual port printer device 100 was turned on, a sensor would detect the presence of the supply web and would auto-feed into printing position. If the dual port printer device 100 is not turned on, a user may manually load the supply web into the loading chute 300 but will not feed supply into printing position.

The user would adjust the width of the loading chute 300 by moving the locklever 302 to an unlocked position. Once the locklever 302 is in an unlocked position, the user can then horizontally slide the supply guide 306/locklever 302 assembly along the guide track 308 to adjust the width of the supply guide 306 and loading chute 300 to accommodate variable width supply rolls. Once the desired width is reached, the user then rotates the locklever 302 approximately 90 degrees to a locked position. When the locklever 302 is rotated 90 degrees to a locked position, the teeth of the guide track 308 are drawn into engagement, and friction holds the locklever 302 in a locked position, and the supply guide 306 is then held in place at the desired width.

Once the width is adjusted and the locklever 302 secured and in a locked position, the user would then feed the supply web into the load chute opening. Once the supply web is fed into the load chute opening, the load chute would then automatically direct the supply web into the printing module (not shown). Specifically, the transfer roller 314 would contact the supply web and direct it into the printing module and the user would then close the front door 106 and begin printing.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of loading a desired size and width of supply roll into a dual port printer device, comprising the steps of:
   providing a dual port printer and at least one supply roll;
   opening a door on the dual port printer and pivotally rotating an inner supply support assembly to access an interior of the dual port printer;
   removing an outer supply flange;
   sliding the at least one supply roll onto a center hub so that it rests against a fixed, inner supply flange to create an edge justified side;
   sliding an outer supply flange onto the center hub and securing the outer supply flange to retain the at least one supply roll in position;
   pivoting the inner supply support assembly back into the interior of the dual port printer;
   rotating a locklever approximately 90 degrees to an unlocked position;
   horizontally sliding the supply support assembly and locklever along the guide track to adjust the width of a loading chute;
   rotating the locklever approximately 90 degrees to a locked position;
   feeding a web from the supply roll into the loading chute;
   directing the web into a printing module; and
   closing the door.

2. The method of claim 1, wherein the center hub rotates on a fixed spindle.

3. The method of claim 1, wherein the center hub includes a bearing surface on each end.

4. The method of claim 1, wherein on end of the center hub is a fixed hub retainer.

5. The method of claim 1, wherein the center hub includes a hidden surface and a single groove.

6. The method of claim 1, wherein when the locklever is rotated approximately 90 degrees to a locked position, and teeth of a guide engage teeth of a guide track to hold the locklever in place.

7. The method of claim 1, wherein the step of feeding the web in the printing module is done by a transfer roller.

8. The method of claim 1, wherein the supply guide has an inside surface such that the inside surface of the supply guide cooperates with the locklever and the locklever is rotatably mounted onto the supply guide.

9. The method of claim 1, wherein the guide track comprises a pocket that receives a sliding feature of the supply guide.

10. The method of claim 1, wherein the dual port printer further comprises:

at least one port for a printed material to exit from;
a touch panel screen;
a printing module;
the touch panel screen and the at least one port are positioned along the door;
and the adjustable loading chute directs a supply web from the supply roll to the printing module to create the printed material.

11. The method of claim 10, wherein the touch screen is located on the center portion of the door, and the printed labels exit through the at least one port in the door below the touch panel screen.

12. The method of claim 1, wherein the door of the printer is hinged.

13. The method of claim 1, wherein the device accommodates different widths of different supply rolls.

14. The method of claim 1, wherein the printer further a transfer roll.

15. The method of claim 14, wherein the transfer roll is on the door of the device.

* * * * *